(12) United States Patent
Imes

(10) Patent No.: US 12,322,178 B2
(45) Date of Patent: Jun. 3, 2025

(54) AUTONOMOUS ACTIVITY MONITORING SYSTEM AND METHOD

(71) Applicant: Hole-In-One Media, Inc., Austin, TX (US)

(72) Inventor: Kevin R. Imes, Austin, TX (US)

(73) Assignee: Hole-In-One Media, Inc., Austin, TX (US)

( * ) Notice: Subject to any disclaimer, the term of this patent is extended or adjusted under 35 U.S.C. 154(b) by 0 days.

(21) Appl. No.: 17/339,219

(22) Filed: Jun. 4, 2021

(65) Prior Publication Data

US 2021/0383124 A1    Dec. 9, 2021

Related U.S. Application Data

(60) Provisional application No. 63/034,696, filed on Jun. 4, 2020.

(51) Int. Cl.
| | |
|---|---|
| *G06V 20/40* | (2022.01) |
| *G06F 16/71* | (2019.01) |
| *G06N 20/00* | (2019.01) |
| *G06V 40/20* | (2022.01) |
| *G11B 27/34* | (2006.01) |
| *H04N 7/18* | (2006.01) |

(52) U.S. Cl.
CPC ............ *G06V 20/42* (2022.01); *G06F 16/71* (2019.01); *G06N 20/00* (2019.01); *G06V 40/23* (2022.01); *G11B 27/34* (2013.01); *H04N 7/181* (2013.01)

(58) Field of Classification Search
None
See application file for complete search history.

(56) References Cited

U.S. PATENT DOCUMENTS

| | | | |
|---|---|---|---|
| 8,339,456 B2 * | 12/2012 | Eledath | G06T 7/215 |
| | | | 348/172 |
| 10,904,474 B2 * | 1/2021 | Han | G11B 27/19 |
| 2010/0182436 A1 * | 7/2010 | Boman | H04N 7/188 |
| | | | 342/450 |
| 2013/0303248 A1 * | 11/2013 | Williams | A63F 9/143 |
| | | | 463/6 |
| 2014/0316614 A1 * | 10/2014 | Newman | G05D 1/102 |
| | | | 705/26.4 |

(Continued)

FOREIGN PATENT DOCUMENTS

| | | | | |
|---|---|---|---|---|
| CA | 3030958 C | * | 11/2019 | ........... A61B 5/1122 |
| WO | WO-2006059286 A1 | * | 6/2006 | ......... A63B 24/0021 |

(Continued)

*Primary Examiner* — Gelek W Topgyal
(74) *Attorney, Agent, or Firm* — Dickinson Wright PLLC; Charles W. Kocher, II

(57) ABSTRACT

A system for automatically monitoring activity on an athletic activity area is provided. The network device includes artificial intelligence configured to automatically identify objects and gestures from video received from cameras disposed at the activity area. The artificial intelligence automatically edits the video based on objects and gestures identified from the video and generates a video file including predetermined objects and gestures. The artificial intelligence may generate a video including each trial completed by a particular athlete and may provide the video automatically to the player or a third party.

20 Claims, 12 Drawing Sheets

(56) References Cited

U.S. PATENT DOCUMENTS

| | | | | |
|---|---|---|---|---|
| 2015/0264258 A1* | 9/2015 | Bervoets | ............... | H04N 7/181 348/36 |
| 2015/0297949 A1* | 10/2015 | Aman | ..................... | G06T 7/246 348/157 |
| 2016/0192009 A1* | 6/2016 | Sugio | .................. | G06V 10/255 725/32 |
| 2016/0292881 A1* | 10/2016 | Bose | .................. | G08B 21/0492 |
| 2016/0314818 A1* | 10/2016 | Kirk | ........................ | G06F 1/163 |
| 2016/0364819 A1* | 12/2016 | Salimi | .................. | H04W 4/021 |
| 2017/0318325 A1* | 11/2017 | Ortiz | ............... | H04N 21/23614 |
| 2018/0343442 A1* | 11/2018 | Yoshikawa | .......... | H04N 21/438 |
| 2019/0137597 A1* | 5/2019 | Glover | ...................... | G01S 5/14 |
| 2020/0125853 A1* | 4/2020 | Zhao | ....................... | G06F 17/16 |
| 2020/0395048 A1* | 12/2020 | Griswold | ............... | H04N 5/265 |
| 2020/0404174 A1* | 12/2020 | Taxbøl | ................ | G06V 20/42 |
| 2021/0166497 A1* | 6/2021 | Kia | ........................ | G06V 40/25 |

FOREIGN PATENT DOCUMENTS

| | | | | |
|---|---|---|---|---|
| WO | WO-2017011817 A1 * | 1/2017 | .......... | A61B 5/1122 |
| WO | WO-2018094443 A1 * | 5/2018 | | |

\* cited by examiner

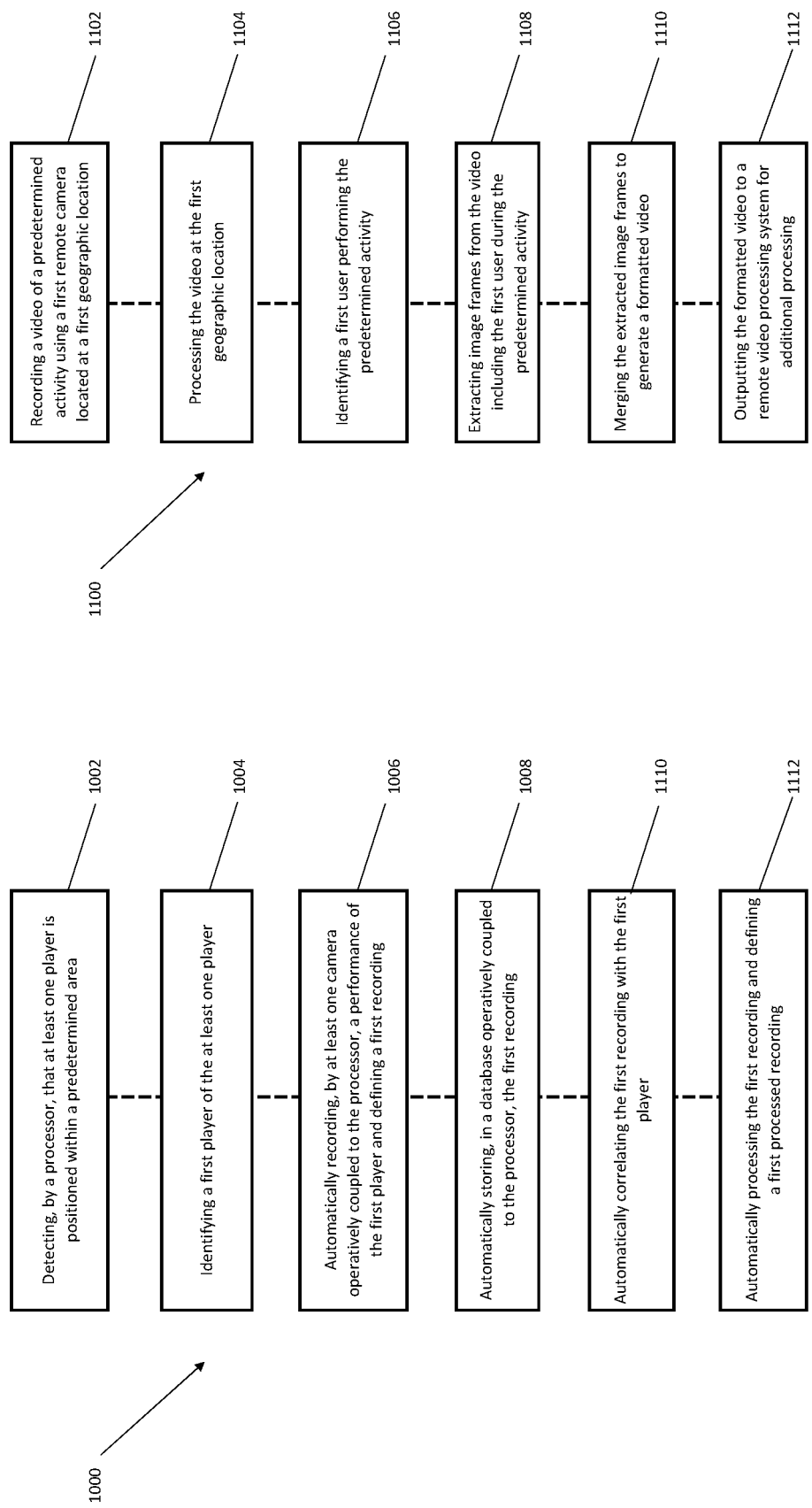

AUTONOMOUS ACTIVITY MONITORING SYSTEM AND METHOD

CROSS-REFERENCE TO RELATED APPLICATIONS

This application claims the benefit of previously filed U.S. Provisional Patent Application No. 63/034,696, filed Jun. 4, 2020, the entire content of which is hereby incorporated by reference in its entirety.

FIELD OF THE INVENTION

The present disclosure is directed to video recordings of activities. More particularly, the present disclosure is directed to automatically monitoring and recording athletic activities, such as golf, using video cameras and computer processing.

BACKGROUND

Amateur and professional athletes participate in a wide range of athletic events and competitions. In the case of professional athletics, it is typical for the athletic competition to be recorded and broadcast on television and/or over the internet. Broadcasters often work together with the athletes or a governing body of the athletic event to provide access to the event and to provide the equipment necessary to record and broadcast the event, including multiple cameras and microphones dispersed at fixed locations or at mobile locations. These arrangements are typical in most professional spectator sports, such as golf, tennis, football, baseball, basketball, soccer, hockey, auto racing, cycling, etc. These arrangements are also typical for collegiate athletics, with events that are often covered with the same or similar types of access and cameras.

In the case of other athletic events, such as typical recreational activities undertaken by amateur non-collegiate athletes, video recording and/or broadcast is not typical, due to the lack of widespread public demand to observe recreational golf, tennis, basketball, or the like. However, it is desirable in many cases by the athletes participating to have their activity recorded, similar to the recordings provided in professional events. Such recordings can be viewed at a later time for entertainment or evaluation purposes. For example, a golfer may desire to record his swing to be able to analyze his swing mechanics for potential improvements. Similarly, a golfer may want to record his shots. Basketball players may similarly want to record their shooting motion and resulting shot, or their movement on the court for evaluating the effectiveness of particular offensive plays or defensive positioning.

However, it is necessary for the recreational athlete to make their own arrangements for their events to be recorded. The athlete may need to provide and set up their own recording equipment and set up their own recording equipment in an effective manner to ensure that the event is sufficiently recorded. Alternatively, the athlete may need to secure the services of a $3^{rd}$ party who can handle recording equipment to obtain different views or adjust to player movement.

In some instances, athletes may provide themselves with a body-mounted camera to record a particular aspect of an event. For example, a head-mounted camera may be used to record a particular cycling route. A rock climber may similarly use a body-mounted camera to record a particular climbing route. These body-mounted cameras are limited, however, in that they typically cannot record the body movements of an athlete in particular. Moreover, the head mounted camera is typically directed according to the position of the user's head, and therefore may only record a limited area corresponding to what the athlete is looking at. In many cases, the camera will not even record what the athlete is focusing on because the camera does not adjust in response to eye movement or changing focus.

Some athletic locations may have recording equipment pre-installed, such as at a basketball court or indoor tennis court, where the playing surface and area are known and constant. However, this is typically not possible for many outdoor recreational activities because of the myriad locations where the athlete may be situated. For example, on a golf course, it is difficult to predict with certainty the path of a golf ball or the location of the golfer on the course, because each location is dependent on the previous location and ball flight from that previous location. For runners, cyclists, climbers, and the like, the location may be even more unpredictable. Accordingly, for recording these types of activities, it is typically necessary for the recreational athlete to have another individual following them and recording them to provide a usable recording.

In view of the above, improvements can be made to recording systems for athletic events.

SUMMARY

It is an aspect of the disclosure to provide a system for automatically recording an athletic event.

It is yet another aspect of the disclosure to provide a system for automatically processing a recording of an athletic event and displaying the recording with additional information.

It is yet another aspect of the disclosure to provide a system for automatically recording a golf shot and processing the images of the golf shot.

In view of these and other aspects, a system for automatically recording and processing an activity is provided. The system includes a first remote camera disposed at a first geographic location to record a video of a first predetermined activity. The system further includes a first processor and memory operatively associated with the first remote camera and in communication with the camera. The first processor and memory are located near the first geographic location. The system further includes a local video processing engine associated with the first processor and memory. The local video processing engine is configured to process frames of video captured by the first remote camera of a first user participating in the first predetermined activity. The first processor is further configured to modify the video upon identifying the first user and the first predetermined activity. The system further includes a communication module capable of communicating a formatted video to a remote video processing system. The remote video processing system is configured to further process the formatted video and enable access of the processed video to the first user.

In one aspect, the processor is configured to detect a position of the first user using one or more of: a geofence; a GPS location; facial recognition; object recognition; clothing recognition; motion detection; RFID detection; Bluetooth detection; Wifi detection; Radar sensing; and Heat sensing.

In one aspect, the system includes an artificial intelligent (AI) logic accessible to the first processor and configured with logic to identify one or more users recorded within a video frame captured by the first remote camera.

In one aspect, the first processor is configured to: identify the first user; automatically record the first user when the first user is positioned within a first predetermined area; associate a first recording of the first user with the first user; associate a second recording of the first user with the first user; and process the first and second recording of the first user and to define the formatted video associated with the first user.

In one aspect, the first processor is configured to detect and identify a second user within the first predetermined area.

In one aspect, the first processor is configured to automatically record the second user and the first processor is configured to process a recording associated with the second user.

In one aspect, the first processor is configured to determine which user of the first and second user is to be recorded.

In one aspect, the first processor is configured to transmit a message to the first user or the second user indicating that the first user or the second user will be recorded.

In one aspect, the first processor is configured to generate a location grid over at least a portion of the first geographic location.

In one aspect, the first processor is configured to detect a location of the first user within the location grid and further configured to detect a location of an object associated with the first user within the location grid.

In one aspect, the first processor is configured to monitor a location of the first user while the first user is located within the first geographic location.

In one aspect, the first processor is configured to add a graphical element to the first processed recording based on data associated with the recording.

In one aspect, the graphical element can include one or more graphical elements added to one or more frames of the video, the graphical elements including: textual information displaying a location of the video; one or more names of the location where the video was recorded; the name of the first user; the date the video was recorded; a logo or other marketing images associated with the location; a colored trace created to show a graphic line between frames of a moving object; graphic objects; and augmented reality elements.

In one aspect, the colored trace includes creating a trace for one or more of: a golf ball flight path; a football player running path; a football flight path; a soccer player running path; a soccer ball flight path; a downhill skier or snowboarder path; a swimming path of a swimmer; a swimming path of a fish caught by the first user; a boating path of a catamaran or boat racing vessel; and a biking path of a mountain or race bike.

In another aspect, a system for automatically recording and processing an activity is provided. The system includes a first remote camera disposed at a first geographic location to record a video of a first predetermined activity. The system further includes a first processor and memory operatively associated with the first remote camera and in communication with the camera. The first processor and memory are located near the first geographic location. The system further includes an artificial intelligent (AI) logic accessible to the processor and configured with logic to identify a user recorded within a video frame captured by the first remote camera. The system further includes a local video processing engine associated with the first processor and memory. The local video processing engine is configured to process images within the video frame to identify the first user. The first processor is further configured to modify the video upon identifying the first user and the first predetermined activity. The system further includes a communication module capable of communicating a formatted video to a remote video processing system. The remote video processing system is configured to further process the formatted video and enable access to a mobile app of the identified first user.

In one aspect, the AI logic includes logic capable of identifying one or more of: a golfer; a golf ball; a shirt; a shirt color; pants; a pants color; a skirt; a skirt color; a hat; a hat color; a golf glove; golf shoes; a golf cart; one or more persons in a golf cart; a golf tee; a golf club; an iron; a driver; a utility club; a putter; a wedge; a golf ball logo; a male; a female; a child; a junior; a shirt logo; a caddie; a marshal; a brand; a left handed golfer; a right handed golfer; a visor; glasses; sunglasses; a beverage; a tee box; a color of a tee box; trees; a fairway; a cart path; a green; a pin; a hole; a sand bunker; a water hazard; a grass hazard; woods; out-of-bounds; rough; a first cut of a green; a second cut of a green; birds; bugs; animals; a distance from tee to pin; a distance from tee to front of green; a distance from tee to center of green; a distance from tee to back of green; red stakes; white stakes; yellow stakes; change in elevation; clouds; rain; snow; fog; mist; mud; wind; topology of green; or cut of hole.

In one aspect, AI logic further comprises logic capable of identifying an activity including one or more of: golf activity; football activity; soccer activity; lacrosse activity; baseball activity; basketball activity; tennis activity; pickleball activity; beenbag toss activity; bowling activity; billiards activity; swimming activity; diving activity; racing activity; hockey activity; field hockey activity; disc golf activity; rugby activity; skiing activity; snowboarding activity; biking activity; fishing activity; boating activity; and sports activity.

In one aspect, the remote video processing system further includes: a remote video processing and management system in communication with the first processor, the remote video processing and management system configured to receive a first series of recorded videos and process the first series of recorded videos to create the AI logic. The processing of the first series of recorded videos includes tagging one or more uniquely identified objects within one or more frames of each of the recorded videos, the tagging including tags for identifying users and user activities within the recorded video. The processing further includes creating the AI logic including a neural network of tagged objects and distributing the AI logic to the first processor for use in processing video at the predetermined location. The processing further includes receiving the formatted video from the communication module and modifying the formatted video based on use of the mobile app.

In one aspect, the system includes a remote video processing and management system in communication with the video processing system. The remote video processing management system includes: a network processor coupled to cloud storage storing processed video received from the video processing system and the first remote camera; an artificial intelligence (AI) enabled graphics processing engine configured to access the formatted video and process the formatted video; graphical assets accessible to the AI enabled graphics processing engine to be added to one or more frames of the formatted video; a format manager configured to format the formatted video based on a distribution location of the formatted video; a distribution manager accessible to the network processor, the distribution manager configured to distribute the formatted video to the distribution location.

In one aspect, the system includes a mobile app associated with the distribution manager, the mobile app including content provided by the distribution manager including: one or more formatted videos output by the remote video processing and management system; a list of videos created using one or more activities; a list of location where the one or more videos were recorded; a social media feature to share the formatted video; and a virtual coaching feature configured to enable a coach to access and comment on the formatted video of the first user.

In one aspect, the processor is configured to identify a second user recorded within the video frame captured by the first remote camera. The processor is configured to extract video frames from the first video, the video frames including the second user. The processor is configured to combine the extracted video frames into a second formatted video, the second formatted video including the second user. The communication module communicates the second formatted video to the remote video processing system configured to further process the video and enable access to a mobile app of the identified second user.

In one aspect, the remote video processing and management system is further configured to: identify the second user in proximity to the first user during the recorded activity; initiate access of a second video generated by the remote video processing system to the first user; and enable the first user access to the second video using the mobile app.

In another aspect, a method of automatically recording and providing video is provided. The method includes recording a video of a predetermined activity using a first remote camera located at a first geographic location. The method further includes processing the video at the first geographic location. The processing includes: identifying a first user performing the predetermined activity; extracting image frames from the video including the first user during the predetermined activity; and merging the extracted image frames to generate a formatted video. The method includes outputting the formatted video to a remote video processing system for additional processing.

In one aspect, the method further includes: identifying a second user performing the predetermined activity within the video; extracting additional image frames including the second user performing the predetermined activity; merging the additional image frames to generate a second formatted video; and outputting the second formatted video to the remote video processing system.

In one aspect, the method includes: providing a second remote camera at the fist geographic location; identifying the first geographic location as a golf hole on a golf course; establishing a first geofence around the tee box of the golf hole; establishing a second geofence around the green of the golf hole; detecting when a first user is within the first geofence; activating recording of the first remote camera and the second remote camera in response to identifying the first user within the first geofence to record the predetermined activity; detecting when the first user is within the second geofence; detecting when the first user leaves the second geofence; and disabling recording of the predetermined activity when the first user leaves the second geofence.

In one aspect, the first geofence includes a first geofence radius and the second geofence includes a second geofence radius that is different than the first geofence radius.

In one aspect, the first geofence includes a first geofence size and the second geofence includes a second geofence size that is different than the first geofence size.

In one aspect, the method includes: identifying the predetermined activity as a golf activity; extracting a first image frame to identify a golf ball at a first location within the first image frame; extracting a second image frame at a period of time later than the first image frame; determining if the golf ball moved to another location within the second image frame; drawing a colored line from within the second image frame that extends to the first location; repeating drawing the line with subsequent frames until the golf ball is no longer visible; estimating where the golf ball lands; and drawing a colored line to the estimated location of where the golf ball lands.

In one aspect, the method further includes: creating an AI logic using previously recorded activities to identify a specific activity; identifying the specific activity using the AI logic; identifying the first user performing the specific activity; initiating extracting of image frames of the specific activity; and combining the extracted image frames of the specific activity.

In one aspect, the creating an AI logic further comprises the steps of: identifying a golfer holding a golf club within a previously recorded video; tagging the golfer having specific clothes, a golf club, and a golf ball; repeating the identifying and tagging steps over numerous previously recorded activities and image frames; generating the AI logic using the tagged images; and using the AI logic at a golf course having the first remote camera.

In another aspect, a method of automatically recording an athletic performance is provided. The method includes: detecting, by a processor, that at least one player is positioned within a predetermined area; identifying a first player of the at least one player; automatically recording, by at least one camera operatively coupled to the processor, a performance of the first player and defining a first recording; automatically storing, in a database operatively coupled to the processor, the first recording; automatically correlating the first recording with the first player; and automatically processing the first recording and defining a first processed recording.

In one aspect, the at least one camera comprises a first camera and a second camera.

In another aspect, the method includes identifying, at the processor, a first geographic position of the first camera and a second geographic position of the second camera.

In another aspect, the method includes identifying the predetermined area at the processor.

In another aspect the method includes defining a location grid within the predetermined area.

In another aspect, the method includes detecting an object associated with the first player at a grid location within the location grid.

In another aspect, the method includes, in response to detecting the object at the grid location, automatically adding a graphic associated with the location to the first processed recording.

In another aspect, an identity of the first player is determined via image recognition.

In another aspect, the method includes communicating, by the processor to a mobile device associated with the first player, a signal instructing the player to perform.

In another aspect, the method includes automatically transmitting the first processed recording to the first user.

In one aspect, an athletic activity area is provided. The athletic activity area includes at least one camera device installed at a competition area of the athletic activity area and configured to record video; a network device in communication with the camera device, the network device including a processor, non-transitory computer readable medium, database, and software; an artificial intelligence engine operable on the network device; wherein the database includes a plurality of predetermined image data sets identifying a plurality of predetermined objects or gestures; wherein the artificial intelligence engine is configured to receive video from the cameras and automatically identify objects or gestures present in the video and tag identified objects or gestures; wherein the artificial intelligence engine is configured to process the video and generate a video file based on the identified objects.

In another aspect, a method of automatically monitoring and recording an athletic activity is provided. The method includes the steps of: at a camera device installed on an athletic activity area, automatically recording video in response to detecting athletes on the athletic activity area; wherein the camera is in communication with a network device, the network device including a processor, non-transitory computer readable medium, database, and software, wherein the network device further includes an artificial intelligence engine operable on the network device, wherein the database includes a plurality of predetermined image data sets identifying a plurality of predetermined objects or gestures; at the artificial intelligence engine, receiving video from the cameras and automatically identifying objects or gestures present in the video and tagging identified objects or gestures; at the artificial intelligence engine, processing the video and generating a processed video file based on the identified objects.

In another aspect, a system for automatically monitoring activity is provided. The system includes at least one camera device installed at a competition area and configured to record video. The system further includes a network device in communication with the camera device, the network device including a processor, non-transitory computer readable medium, database, and software. The system further includes an artificial intelligence engine operable on the network device.

The database includes a plurality of predetermined image data sets identifying a plurality of predetermined objects or gestures. The artificial intelligence engine is configured to receive video from the cameras and automatically identify objects or gestures present in the video and tag identified objects or gestures. The artificial intelligence engine is configured to process the video and generate a video file based on the identified objects.

BRIEF DESCRIPTION OF THE DRAWINGS

Other aspects of the present disclosure will be readily appreciated, as the same becomes better understood by reference to the following detailed description when considered in connection with the accompanying drawings wherein:

FIG. 10 illustrates a method of one aspect of the athletic monitoring system in accordance with an aspect of the present disclosure; and FIG. 11 illustrates a method of one aspect of the athletic monitoring system in accordance with an aspect of the present disclosure.

DETAILED DESCRIPTION OF THE DISCLOSURE

Figure 1:
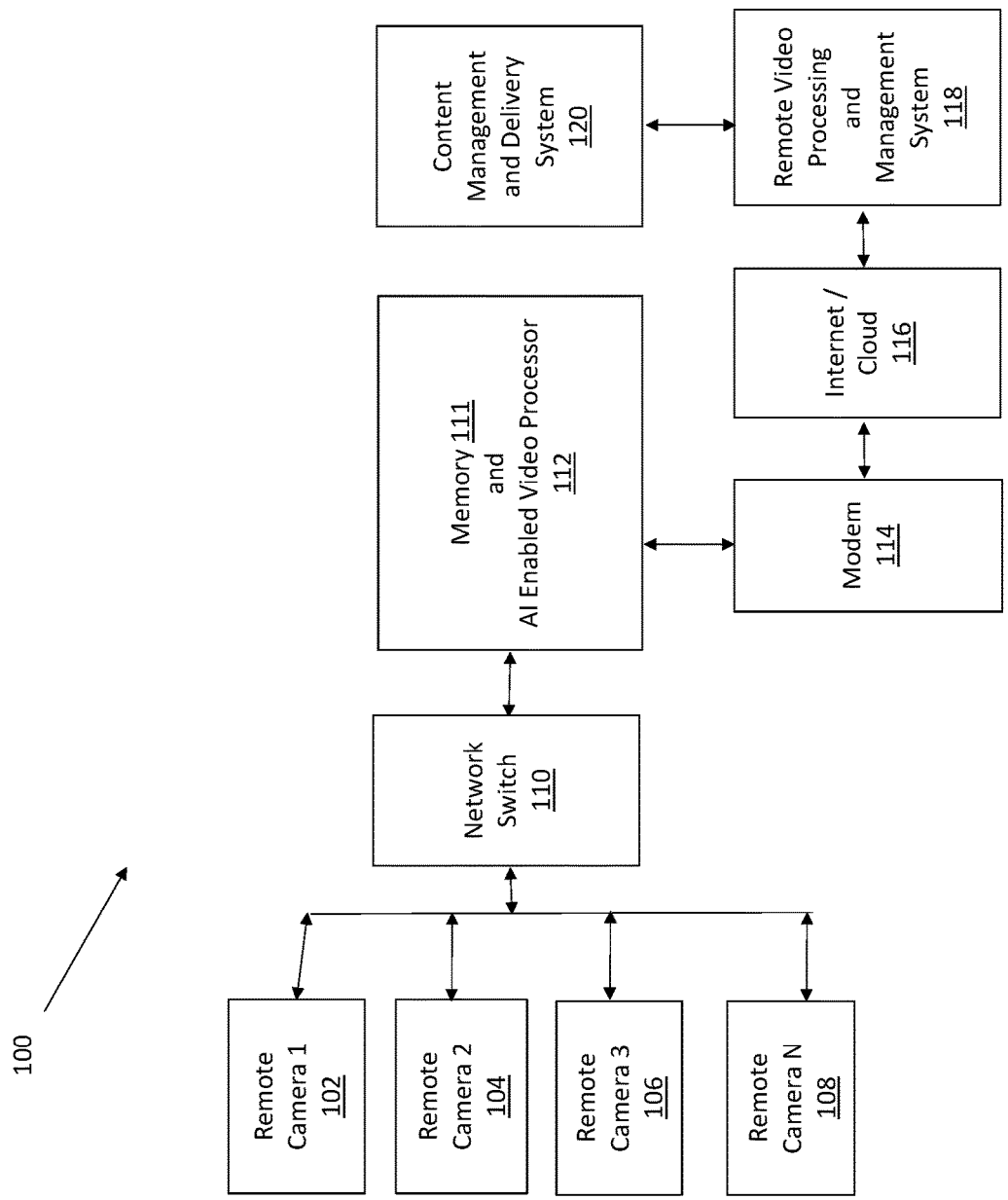
FIG. 1 is a block diagram illustrating a video processing system for detecting and recording activities in accordance with an aspect of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bidirectional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. The communicative interaction between the network elements is not necessarily limited to only one specific form. A network element may be a node, a piece of hardware, software, firmware, middleware, another component of a computing system, or any combination thereof.

For purposes of this disclosure, an athletic monitoring and recording system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an athletic monitoring and recording system can be a personal computer, a PDA, a consumer electronic device, a smart phone, a cellular or mobile phone, a set-top box, a digital media subscriber module, a cable modem, a fiber optic enabled communications device, a media gateway, a home media management system, a network server or storage device, a switch router, wireless router, or other network communication device, or any other suitable device and can vary in size, shape, performance, functionality, and price.

The system can include memory, one or more processing resources or controllers such as a central processing unit (CPU) or hardware or software control logic. Additional components of the system can include one or more storage devices, one or more wireless, wired or any combination thereof of communications ports to communicate with external devices as well as various input and output (I/O) devices, such as a keyboard, a mouse, and a video display. The athletic monitoring and recording system system can also include one or more buses operable to transmit communications between the various hardware components.

In the description below, a flow charted technique or algorithm may be described in a series of sequential actions. Unless expressly stated to the contrary, the sequence of the actions and the party performing the actions may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

Also used within the description are uses of Artificial Intelligence (AI) or AI Logic, Machine Learning, and Neural Networks. AI or AI Logic includes a several categories of techniques that allow computers to mimic human capabilities. AI techniques or logic include Machine Learning, Speech and Language Processing, Expert Systems, and Robotics. Machine Learning is the subset of AI that enables computers to improve at tasks through experience. Machine Learning includes traditional statistics-based approaches such as Regression Analysis and newer techniques like Deep Learning. Deep Learning uses large amounts of historical data to train multilevel Neural Networks to draw conclusions about new data. Throughout the specification, the description uses AI logic that deploys Deep Learning, in the form of Neural Networks, to identify classes of objects, object locations in video images and segments. Deep Learning is also used to identify distinctive activities or sub-activities within the video images and segments. In some forms, Statistics-based machine learning is used to characterize the motion or direction of objects within the video images and segments.

Example aspects of an autonomous recording and processing system will now be more fully described. Each of these example aspects are provided so that this disclosure is thorough and fully conveys the scope of the inventive concepts, features and advantages to those skilled in the art. To this end, numerous specific details are set forth such as examples of specific components and methods associated with the system to provide a thorough understanding of each of the aspects associated with the present disclosure. However, as will be apparent to those skilled in the art, not all specific details described herein need to be employed, the example aspects may be embodied in many different forms, and thus should not be construed or interpreted to limit the scope of the disclosure.

Various aspects of the disclosure may refer generically to hardware, software, modules, or the like distributed across various systems. Various hardware and software may be used to facilitate the features and functionality described herein, including, but not limited to: an NVIDIA Jetson TX2 computer, having a 256-core NVIDIA Pascal GPU architecture with 256 NVIDIA CUDA cores, and a Dual-Core NVIDIA Denver 2 64-bit CPU and Quad-Core ARM Cortex-A57 MPCore, including 8 GB 128-bit LPDDR4 memory and 32 GB eMMC storage. Software may include: Linux operating system having Python programmed applications; OpenCV image processing library; AWS Greengrass ML Model Development and Execution; video editing software using OpenCV image processing library and Python programming. Various cloud services and for storing and sending video may be used, including AWS S3 and AWS Glacier for video storage, and AWS CloudFront for content delivery and distribution. Cloud services for processing and editing video may include Python and OpenCV running on AWS EC2 servers. Cloud services for converting videos from one format to another may include AWS Elemental MediaConvert. Cloud services and AI for generating a Neural Network may include AWS SageMaker for constructing, training, tuning, and evaluating machine learning models, including Keras/TensorFlow developmental framework, and Sagemaker NEO to prepare models for deployment to local computers.

Cameras for use in the systems described herein may be HD cameras or 4K cameras.

A 4K camera may be manufactured by Hanwha, Model PNP-9200 RH having specifications and operating manual herein incorporated by reference. Hanwha camera model PNO-9200 RH is a 4K PTZ Camera including the following specifications:

Imaging Device Sensor: 1/2.5" 8 MP CMOS
 Resolution: 3,840 (H)×2,160 (V), 8.00 M pixels
 Focal Length (Zoom Ratio): 4.8~96 mm (Optical 20×)
 Angular Field of View H/V: 65.1 deg. (Wide)~3.8 deg. (Tele)/38.4 deg. (Wide)~2.2 deg (Tele)
 Auto-Focus & Auto-Iris
 Infrared Illumination
 120 db Dynamic Range
 Pan Range/Speed: 360 degrees/400 degrees per sec
 Tilt Range/Speed: 190 degrees/300 degrees per sec
 16× Digital Zoom
 Application Programming Interface: ONVIF Profile S/G
 Video Compression Formats: H.265/H.264, MJPEG
 Max. Framerate H.265/H.264: 30 fps at all resolutions
 Audio In Selectable (Mic in/Line in)
 Ethernet: 10/100 BASE-T
 Operating Temperature/Humidity: −58° F.~+131° F./less than 90% RH
 Ingress Protection: IP66/Vandal Resistance IK10
 Input Voltage: 24V AC
 Power Consumption: 90 W (Heater on, IR on)

A camera may be an HD camera capable of recording in High Definition. As such, a camera may be a Hanwha HD 1080p PTZ camera having a Model Number XNP-6321H with specifications and operating manual herein incorporated by reference. Hanwha camera Model XNP-6321H is a HD 1080p PTZ Camera including the following specifications:

Imaging Device: 1/2.8" 2.4M CMOS
 Resolution: 1,981 (H)×1,288 (V), 2.55 M
 Focal Length (Zoom Ratio): 4.44~142.6 mm (Optical 32×)
 Angular Field of View H/V: 61.8 deg. (Wide)~2.19 deg. (Tele)/36.2 deg. (Wide)~1.24 deg (Tele)
 Auto-Focus & Auto-Iris
 IR Illumination
 150 db Dynamic Range
 Pan Range/Speed: 360 degrees/700 degrees per sec
 Tilt Range/Speed: 210 degrees/700 degrees per sec
 Digital Zoom: 32×
 Application Programming Interface: ONVIF Profile S/G
 Video Compression Formats: H.265/H.264, MJPEG
 Max. Framerate H.265/H.264: 60 fps at all resolutions
 Audio In Selectable (Mic in/Line in)
 Ethernet: 10/100 BASE-T
 Operating Temperature/Humidity: −31° F.~+131° F./less than 90% RH
 Ingress Protection: IP66/Vandal Resistance IK10
 Input Voltage: 24V AC or POE+
 Power Consumption: Max. 24 W (Heater Off), Max. 65 W (Heater on, 24V AC)

Referring now to FIG. 1, a block diagram illustrating a video processing system for detecting and recording activities is provided. Video processing system, generally illustrated at system 100. For purposes of discussion, various embodiments and aspects of system 100 are described and illustrated herein, with various system modules distributed across different interconnected systems, hardware, and software, which communicate with each other in a wired or wireless manner, both locally and remote over the internet/cloud. Various functionalities of system 100 described herein may be accomplished with the use of a computer, including processor and non-transitory computer readable medium or memory, with instructions stored thereon to be executed by processor. System 100 may function automatically according to rules set forth in various algorithms. It will be further appreciated that the various processors, memory, and instructions may be distributed among various systems and via the cloud, and that some instructions or processing may occur remotely and be communicated between systems or modules.

According to an aspect, system 100 can include a first remote camera 102, a second remote camera 104, a third remote camera 106 or various combinations of additional cameras illustrated generally as Nth remote camera 108. System 100 also includes a network switch 110 connecting one or more remote cameras 102-108 to AI enabled video processor 112. System 100 includes non-transitory memory 111 connected to AI enabled processor 112. Remote cameras 102-108 may be operatively connected to network switch 110 and can be controlled by AI enabled video processor 112. In other forms, cameras 102-108 can work independently with on-board capabilities for recording video as described herein.

System 100 can also include modem 114, such as a cellular modem or hardwired modem, configured to communicate or transmit data via a network such as Internet/Cloud 116. Modem 114 can be a cellular modem capable of communicating using a 3G, 4G, 5G, or other communication standard. In other forms, modem 114 can be a wired modem capable of communicating using a broadband connection such as Ethernet or via a Fiber Optic connection, or various combinations thereof.

According to an aspect, modem 114 may be configured to communicate raw video data captured by remote cameras 102-108 for further processing, or modem 114 may be configured to communicate processed videos created by AI Enabled processor 112. Thus, according to an aspect, modem 114 may be configured to communicate with, or be in operative communication with, Internet/Cloud 116.

According to a further aspect, system 100 may further include a remote video processing and management system 118 connected to modem 114 via the Internet/Cloud 116. Remote video processing and management system 118 may process video automatically and manage distribution of video files created. System 100 may further include a content management and delivery system 120 in communication with remote video processing and management system 118. Content management and delivery system 120 may be configured to further control distribution of video created by system 100.

For example, in response to receiving raw video data at remote video processing and management system 118, the system 100 may be configured to automatically process the video in accordance with predetermined instructions. In response to processing video, content management and delivery system 120 may receive the processed video, and in response thereto transmit or make available the processed video to an end user. As such, system 100 can use video processing located near a remote camera to detect a video activity and process video in one or more forms locally to the camera, within a cloud service, or combinations thereof.

According to an aspect, system 100 can be used in a golf environment to detect a golfer and record and communicate a golfers activity in the form of processed video. During use of system 100 in a golf environment, system 100 may be configured to automatically capture video data of a golfer via cameras 102-108. In response to capturing video data, system 100 may receive video data from cameras 102-108 at AI Enabled Processor 112. AI Enabled processor 112 may automatically process video data and create a processed video. For example, AI enabled processor 112 can be used to detect a golfer using image data from the video and a neural network created to detect a person within a video or image frame. Upon detecting the person, a neural network (NN) can be created to identify other elements of the golfer such as the golfer's clothes, shoes, a hat, a golf club, aa golf ball, or various other aspects or combinations of aspects that are unique to a golf activity. Upon identifying the golfer, system 100 can capture and process video for that specific golfer. In response to creating processed video, AI Enabled Processor 112 may transmit video data. Processing of video data may occur locally or remotely. For example, AI Enabled Processor 112 may be part of cameras 102-108, or at a computer or processing system in communication with cameras 102-108, or in the cloud.

According to another aspect, system 100 may be configured to detect the presence of one or more golfers within a predetermined area associated with cameras 102-108. For example, system 100 is configured to detect, via signals sent to AI Enabled Processor 112, that a golfer has reached the hole on the golf course where cameras 102-108 have been installed and calibrated. System 100 is further configured to detect when one or more golfers have completed the hole and have left the hole. In this manner, a limited amount of video may be captured and recorded only when a golfer is present thereby reducing the amount of memory and processing needed to store, process and communicate video.

According to a further aspect as described in further detail below, a golfer may have a transmitter associated with themselves, such as a GPS or Location Services enabled device such as a mobile device, smartphone or tablet or other GPS or Location Services enabled device, an RFID device, a Bluetooth enabled device, or any combination thereof, which may communicate with system 100 to indicate the presence of a golfer. In another form, system 100 may be configured to communicate with a golf cart having a GPS or Location Services tracking system integrated within the golf cart to detect the location of a golf cart and a golfer.

Thus, for example, prior to automatically recording video at cameras 102-108, system 100 may receive a proximity signal from a device associated with a golfer. In response to receiving a proximity signal, system 100 may automatically begin recording the hole via cameras.

According to another aspect of the disclosure, one or more of remote cameras 102-108 may include GPS or Location Services positioning functionality, such as a GPS or Location Services device installed in one or more remote camera 102-108, such that the GPS coordinates of remote cameras 102-108 may be known. A GPS or Location Services device can be used to detect and transmit to system 100 specific GPS coordinates of each camera 102-108, thereby providing points of reference to system 100 to provide system 100 with location data of each remote camera 102-108, such that other objects on a golf hole and within the field of view of remote cameras 102-108 may be detected by the cameras 102-108. As such, system 100 can triangulate to determine a location of an object relative to remote cameras 102-108.

According to another aspect, during an initial setup phase of system 100 at a golf course, remote cameras 102-108 may be installed at fixed locations determined by an installer at the golf hole, depending on the specific layout of the golf hole. As is typical, each golf hole is unique, having a unique layout between the tee box and the green and areas in between, including different grass cuts (such as a fairway, first cut, rough, fringe, etc.). In one aspect, first camera 102 may be disposed behind a tee box, and second camera 104 may be disposed behind a green. When installed, remote cameras 102-108 are typically placed in a position that is not in the expected path of the ball flight. Put another way, first remote camera 102 can be located behind a golfer when a golfer is facing the green while standing on a tee box, and second remote camera 104 can be located beyond the green in a direction relative to a tee box. Accordingly, remote cameras 102-108 are positioned such that an impact from the golf ball would be unlikely. It will be appreciated that system 100 can include multiple different cameras at a variety of different locations.

Figure 2:
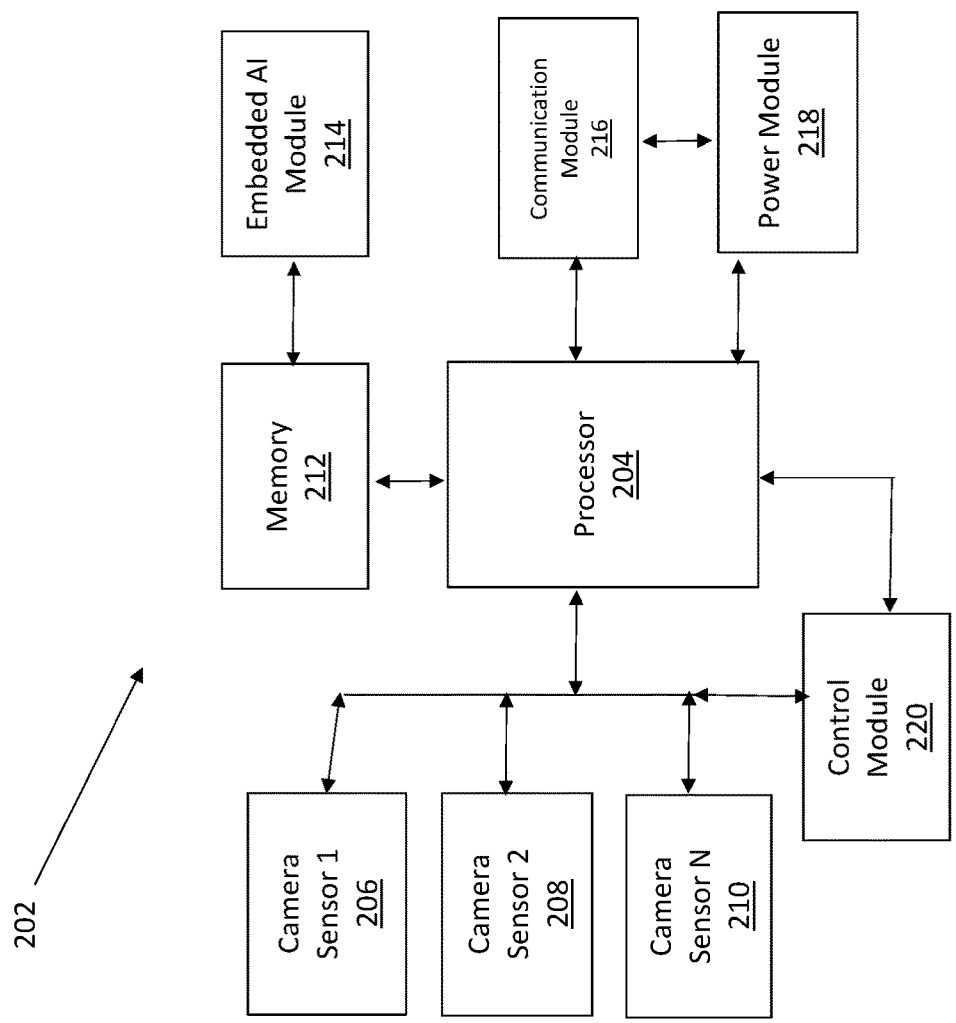
FIG. 2 is a block diagram illustrating an AI enabled camera for use with a video processing system in accordance with an aspect of the present disclosure.

Referring now to FIG. 2, a block diagram illustrating an AI enabled camera for use with a video processing system is provided. An AI Enabled Camera, illustrated generally at 200, includes on-board processor 204 and one or more sensors 206, 208, 210, which may be configured to send signals and/or video to processor 204.

Sensors 206-210 can include optical sensors and in some form can include various types or combinations of sensors, including, but not limited to, optical, motion, infrared, radar or Doppler sensors, Bluetooth sensors, WiFi Sensors, RFID sensors, or various combinations thereof. Camera 202 may further include memory 212 in communication with processor 204, and an embedded AI module 214 in communication with the memory 212. The AI module 214 may be in the form of software stored on memory 212 and executed by processor 204.

Camera 202 may further include a communication module 216 in communication with processor 204 and a power module 218. Communication module 216 may wired or wireless communication such as fiber optic, Ethernet, Power over Ethernet (POE), and the like. Wireless communication can be Wi-Fi or other 802.11 communication, Bluetooth, cellular communication or various combinations thereof. Power module 218 may be configured to provide power to camera 202. Power module 208 may be in the form of a battery or hard wired input connected to a power grid or other source of power. According to one aspect, power can be provided using a POE connection sufficient to power camera 200 over a given distance. Thus, in reference to the automatic video recording and processing steps described herein, camera 202 may perform these steps, and in response to creating the processed video, camera 202 may transmit the processed video to the end user.

Camera 202 may further include a control module 220 in communication with camera sensors 206-210. Control module 220 is in communication with processor 204, and may receive signals from the sensors 206-210 and provide signals to processor 204 for controlling camera 202. Control module 220 may be configured to pan, tilt, or zoom camera 202. Camera 202 may be used for any other cameras described herein. The various cameras described herein may include some or all of the functionality associated with camera 202. For example, various cameras described herein may include pan, tilt, and zoom functionality, but some may not include on board AI processing, for example. For example, in one aspect, in response to detecting one or more golfers, the camera 202 may generate a control signal for the control module 220 to tilt/pan, or zoom the camera 202 automatically.

According to an aspect, camera 202 may be a 4K camera manufactured by Hanwha, Model PNP-9200RH having specifications and operating manual herein incorporated by reference. Camera 202 as Hanwha camera model PNO-9200RH is a 4K PTZ Camera including the following specifications:

Imaging Device Sensor: 1/2.5" 8 MP CMOS
Resolution: 3,840 (H)×2,160 (V), 8.00M pixels
Focal Length (Zoom Ratio): 4.8~96 mm (Optical 20×)
Angular Field of View H/V: 65.1 deg. (Wide)~3.8 deg. (Tele)/38.4 deg. (Wide) 2.2 deg (Tele)
Auto-Focus & Auto-Iris
Infrared Illumination
120 db Dynamic Range
Pan Range/Speed: 360 degrees/400 degrees per sec
Tilt Range/Speed: 190 degrees/300 degrees per sec
16× Digital Zoom
Application Programming Interface: ONVIF Profile S/G
Video Compression Formats: H.265/H.264, MJPEG
Max. Framerate H.265/H.264: 30 fps at all resolutions
Audio In Selectable (Mic in/Line in)
Ethernet: 10/100 BASE-T
Operating Temperature/Humidity: −58° F.~+131° F./less than 90% RH
Ingress Protection: IP66/Vandal Resistance IK10
Input Voltage: 24V AC
Power Consumption: 90 W (Heater on, IR on)

Alternatively, camera 202 may be provided as an HD camera capable of recording in High Definition. As such, camera 202 can include a Hanwha HD 1080p PTZ camera having a Model Number XNP-6321H with specifications and operating manual herein incorporated by reference. Camera 202 as Hanwha camera Model XNP-6321H is a HD 1080p PTZ Camera including the following specifications:

Hanwha HD 1080p PTZ Security Camera—Model XNP-6321H
Imaging Device: 1/2.8" 2.4M CMOS
Resolution: 1,981 (H)×1,288 (V), 2.55M
Focal Length (Zoom Ratio): 4.44~142.6 mm (Optical 32×)
Angular Field of View H/V: 61.8 deg. (Wide)~2.19 deg. (Tele)/36.2 deg. (Wide) 1.24 deg (Tele)
Auto-Focus & Auto-Iris
IR Illumination
150 db Dynamic Range
Pan Range/Speed: 360 degrees/700 degrees per sec
Tilt Range/Speed: 210 degrees/700 degrees per sec
Digital Zoom: 32×
Application Programming Interface: ONVIF Profile S/G
Video Compression Formats: H.265/H.264, MJPEG
Max. Framerate H.265/H.264: 60 fps at all resolutions
Audio In Selectable (Mic in/Line in)
Ethernet: 10/100 BASE-T
Operating Temperature/Humidity: −31° F.~+131° F./less than 90% RH
Ingress Protection: IP66/Vandal Resistance IK10
Input Voltage: 24V AC or POE+
Power Consumption: Max. 24 W (Heater Off), Max. 65 W (Heater on, 24V AC)

As such, camera 202 may be realized as various different types of cameras and may be deployed and used with the various video processing systems and methods described herein.

Figure 3A:
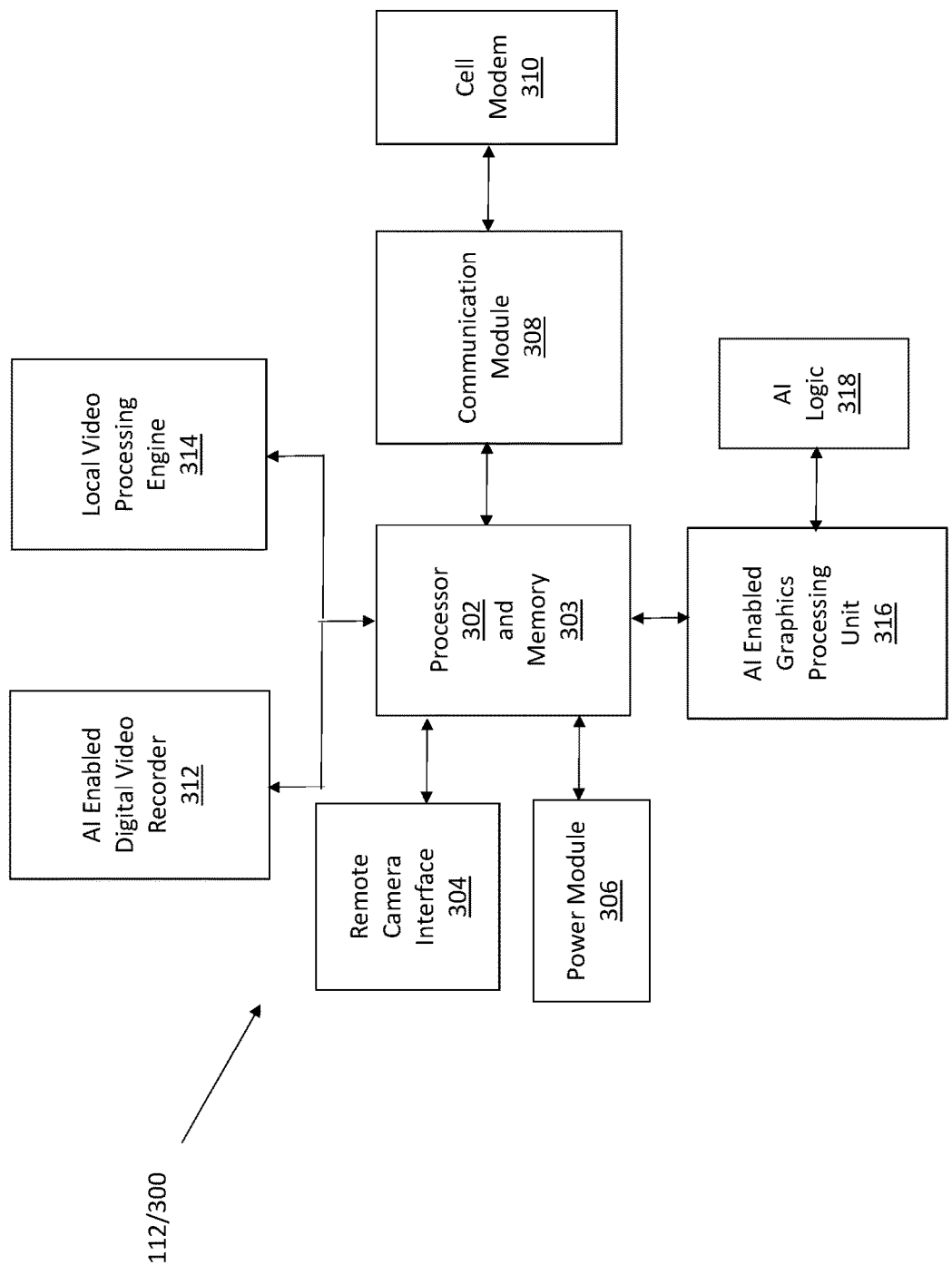
FIG. 3A is a block diagram illustrating an AI enabled video processing system for local video processing in accordance with an aspect of the present disclosure.

Referring now to FIG. 3A, a block diagram illustrating an AI enabled video processing system is provided. An embedded AI video processing system, illustrated generally as system 300 includes processor 302 and memory 303. System 300 can include an NVIDIA Jetson TX2 system to process and control local video cameras. Processor 302 can include a Dual-Core NVIDIA Denver 2 64-Bit CPU and Quad-Core ARM® Cortex®-A57 MPCore, memory 303 can include 8 GB 128-bit LPDDR4 Memory and can also include 32 GB eMMC of storage. System 300 can also include AI enabled graphics processor 316 which can include 256-core NVIDIA Pascal™ GPU architecture with 256 NVIDIA CUDA cores. Operating software for system 300 can include a Linux operating system, Python as an application programming language, and OpenCV image processing Library. System 300 further includes AI logic module 318 including a Machine Learning Deployment and Execution software such as Amazon Web Services Greengrass ML software.

System 300 further includes a remote camera interface 304 in communication with processor 302. Remote camera interface 304 may be connected to network switch 110 illustrated in FIG. 1, or other interfacing/communication mechanism that connects camera processor 302. System 300 may further include a power module 306 and configured to provide power to processor 302 and other components of system 300. Power module 306 may be in the form of a battery, or may be a hard-wired connection to another source of power, such as a power grid or existing power source. Remote camera interface 304 can be used to power remote cameras connected to remote camera interface 304. According to one aspect, remote camera interface 304 can be an Ethernet interface and each of the cameras (not illustrated) may be powered and controlled using a PoE connection. Other forms of connection can also be used including, but not limited to fiber optic, coaxial cable, twisted pair, single strand or various combinations thereof.

System 300 may further include communication module 308 connected to processor 302 and a modem such as cellular modem 310, configured to transmit data. Modem 310 may be the modem 114 of FIG. 1 or other forms of modems as needed. Modem 310 can communicate with a wireline or wireless network capable of connecting the Internet or Cloud based services. Communication module 308 can be used to determine the location or address to communicate with via modem 310, and may further receive data or instructions for processor 302 via the modem 310.

Additionally, according to an aspect, system 300 may further include AI enabled digital video recorder 312 and local video processing engine 314, each of which may be connected to processor 302 and may receive control signals from processor 302. Video recorder 312 and processing engine 314 may combine to receive raw video and store raw video, and may then process raw video automatically to detect specific objects and create specific types of video described herein.

During use, system 300 can set up and control cameras using remote camera interface 304, to capture and record video. AI Enabled graphics processor 316 can perform object detection on the recorded video to identify a predetermined activity. If the predetermined activity is valid, system 300 can process the video into segments for a detected user. System 300 can edit the segments, as needed, and combine the segments into a video file uniquely for the detected user. The video file may then be uploaded to the Internet or Cloud using communication module 308 and cell modem 310. In this manner, local video processing using AI capabilities may be deployed at a location thereby reducing the overall file size of a video file, generating user specific content, and efficiently communicating video files to the Internet or Cloud for expedited access.

According to a further aspect, system 300 can provide AI video processing locally near a geographic location of an installed remote camera to provide automatic monitoring and processing of a desired activity. Thus, the automatic detection and video recording/processing may be performed by system 300, and the processed video may be transmitted to an end user. The processed video may be received and forwarded to the end user via an intermediate server or other communication device.

However, in another aspect, system 300 may use remote AI video processing, as further discussed below. When processing video remotely, video may still be recorded locally by one or more remote camera. Recorded video can then be communicated by system 300 to a remote processing system (not expressly illustrated) to edit and incorporate additional graphics automatically using remote video processing system such as remote video processing system 400 described below.

Figure 3B:
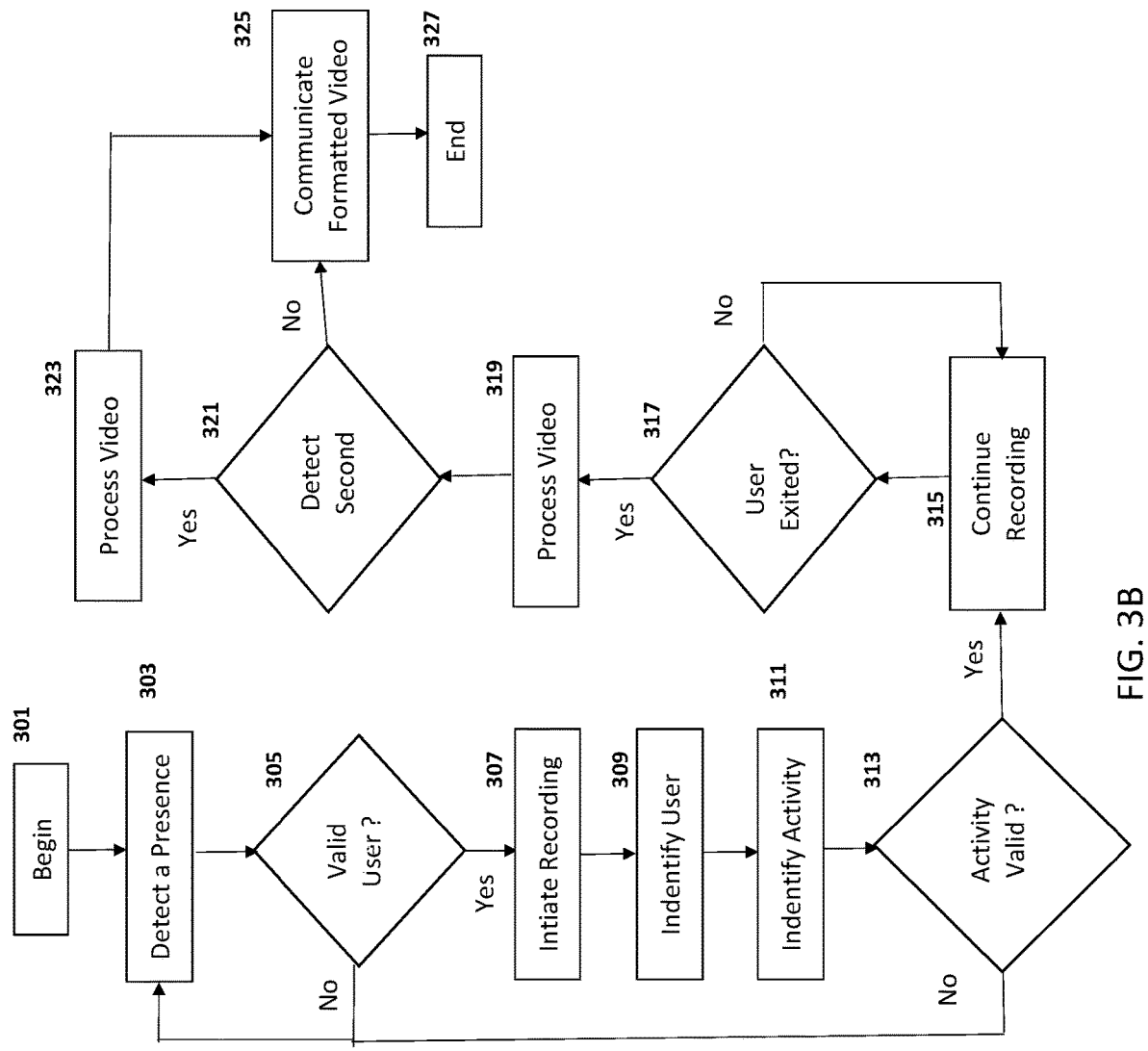
FIG. 3B is a flow diagram of a method for local video processing in accordance with an aspect of the present disclosure.

FIG. 3B is a flow diagram of a method for local video processing in accordance with an aspect of the present disclosure. The method may be used by one or more of the systems, devices, processors, modules, software, firmware, or various other forms of processing to carry out the method described in FIG. 3B. Additionally, FIG. 3B may be realized as within various portions of FIG. 1-3A, 4-8, and in some aspects, may be modified to include various functions, uses, and features described therein.

The method begins generally at step 301 and can be used at various geographic locations where a predetermined activity is to be performed. As one example, the method can be used for local processing and video capture on a golf course as described below although other activities can be described in connection with the method of FIG. 3B. The method proceeds to step 303 when a presence is detected. For example, a golfer may be detected as they approach a tee box in connection with playing a golf hole. Detection can occur in a variety of ways including, but not limited to using receiving a signal from another transmitter, such as GPS or RFID, Wi-Fi, Bluetooth, location services within a mobile device or other sensors to detect a presence including motion detection, RFID detection, Bluetooth detection, Wifi detection, Radar sensing, thermal or heat sensing or various other sensing technologies. In addition to detecting the presence of the individual golfers, similar transmitters may be provided on a golf cart or the like, to indicate the presence of one or more golfers. It will be appreciated that other detection mechanisms may also be used.

Upon sensing a presence, the method proceeds to step 305 to determine if a user is valid. For example, a presence detected may be a deer on a golf course or a jogger or walker. As such, a golfer can be detected at step 305 using various types of techniques. For example, in one form, a golfers location services of a mobile device having an application for recording video can be detected. For example, a geofence can be placed on a tee box and when a valid golfer approached the tee box, the geofence will trigger to validate the user. Other forms of validation can also be used such as AI Logic that includes facial recognition of the golfer and detected by a camera at the location. In another form, AI logic can include an object recognition Neural Network capable of identifying objects that are unique to golfers. For example, the AI logic can identify a person and a golf club on the tee box. Other forms of object recognition can be used to identify a golfer as described herein.

If a user is not valid, the method proceeds to step 303 until another presence is detected. If at step 305, a valid user is detected, the method proceeds to step 307 and initiates recording the activity. For example, multiple cameras may be present on a golf hole or other activity location and can be used to record an activity. As such, when a valid user is detected, the remote cameras associated with a geographic location can begin recording the event. In one form, the recording can be initiated by an individual as well. For example, a golfer may have a mobile device with an app associated with the cameras located at the geographic location. As such, the golfer may step onto the green and initiate recording the golf activity. In this manner, the recording can occur either automatically or through the use of a user initiating the recording.

The method then proceeds to identify the user at step 309. For example, at step 309 a golfer may have been detected and at block 309, a user can be identified during the recording. For example, the method can use image processing to identify the clothing a user is wearing and in other forms, AI logic can be used to identify the specific user using facial recognition. Upon a user being identified, the method can proceed to step 311 and identify the activity. For example, a golfer with a golf club can be used to identify the activity within one or more frames of a video segment. In some forms, other individuals with golf clubs may appear on the tee box that have not subscribed to a service provided with the method of FIG. 3B. As such, if an invalid user is swinging a golf club, the method would not count the activity as being valid and would proceed to step 303. In other forms, a maintenance worker may be present on the tee box doing work on the tee box. The method would identify the activity and at step 313, use AI Logic having valid activities dismiss the activity as being invalid. The method would then proceed to step 303 until another presence is detected. If at step 313 a valid activity is detected, the method proceeds to step 315 and continues to record the video.

Upon continuing recording, the method would check at step 317 to determine if the user is still present at the geographic location. For example, the user may be a golfer and can strike the ball multiple times before completing the hole. As such when the user leaves a predetermined region of the geographic location, such as the green, the recording will end. If the user has not exited or left, the remote camera(s) will continue to record. If at step 317 the user is no longer present or detected, the method proceeds to step 319 where the video is processed for the user.

At block 319, local processing of video can include a variety of AI logic processing, image process, formatting and compression techniques as described herein. According to one aspect, the video can be segmented into portions that include only the identified user. Segmentation can occur using AI Logic or image processing to validate the user within the segments. Once the segments have been created, additional information, such as ball tracing and predetermined graphics, can be added to the video segments. The video segments can then be merged together and formatted to a format that can be used by and end user. According to another aspect, the final video may be compressed prior to communicating from a local video processor. In other forms, various portions of processing can be added or removed depending on the desire of the method to perform local processing.

Upon processing the video, the method proceeds to step 321 and detects if another user is present. For example, the video may be of a snowboarder going down a trail with multiple friends boarding with him or her. The method would then detect another valid user in the video and extract the segments of the video where the second snowboarder is present. Upon extract the segments for the additional user, the method can proceed to step 323 and process the video for the second user. For example, the processed video for multiple snow boarders may include a trace or colored line detailing where the second snowboarder descended relative to the first snowboarder. In this manner, multiple users can be detected using the same video and a unique video may be segmented for that user. Although as shown as only a second user, it should be understood that the video can be processed to detect multiple additional users as needed or desired. Upon processing the second user video the method proceeds to step 325 and communicates the formatted video and to step 327 where the method ends.

Figure 4A:
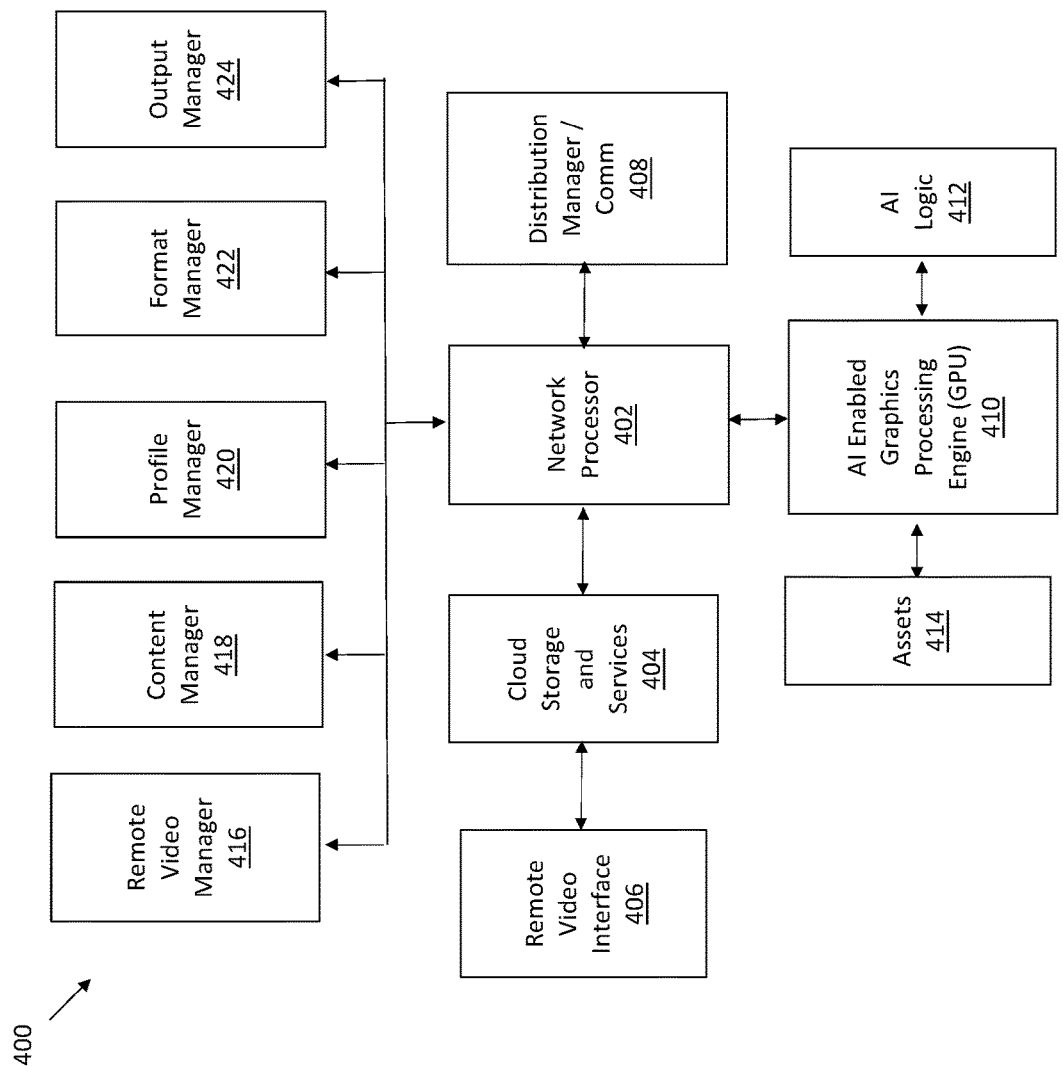
FIG. 4A is a block diagram illustrating an AI enabled video processing system for remote video processing in accordance with an aspect of the present disclosure.

Referring now to FIG. 4A, a block diagram illustrating an AI enabled video processing system for use remotely is provided according to an aspect of the present disclosure. The AI enabled video processing system, illustrated generally as remote video processing system and management system or remote processing system 400, includes a network processor 402 connected to cloud storage and services 404, which is connected to a remote video interface 406 capable of communicating video from a remote camera (not expressly illustrated). Network processor 402 can access various modules for managing and processing video received from remote video interface 406. For example, network processor can access a remote video manager 416, a content manager 418, a profile manager 420, a format manager 422, and an output manager 424. Each manager listed can be provided as a software module or program interface that can be accessed as needed by network processor 402.

Network processor 402 can also be realized as a cloud service that can be deployed using Amazon Cloud Services, IBM Cloud Services, Microsoft Cloud Services, or various combinations thereof. Cloud Storage and services 404 and distribution manager/communication 408 can also include various types of cloud storage services and distribution services having different storage capabilities and accessibility. For example, some content may be stored for immediate access while other forms of content can be stored for delayed access using a deep storage technique. This will enable flexibility in access to content such as video while reducing the overall cost on a user by user basis. For example, if a user has elected to pay for longer term storage, image processing system can modify the type of storage on a rate by rate basis. As such, cloud storage and services 404 can include various different types of on-line services and according to one aspect, can include Amazon Web Services (AWS) Glacier for storing video in the cloud. Additionally, Content manager 418 and distribution manager/communication 408 can utilize AWS Cloudfront as a content delivery service that distributes videos to end users.

Remote system 400 can also include an AI Enabled graphics processing engine or GPU 410. GPU 410 can include various types of AI enabled processors and in one form, includes one or more NVIDIA V100 Tensor Core GPU capable of AI processing to generate and develop and train a Machine Learning (ML) for AI Logic 412 that can be created, modified, distributed and used by system 400 or other AI enabled processors described herein. According to one aspect, GPU 410 and/or network processor can also utilize additional software and services to create AI logic 412. For example, GPU 410 can use AWS SageMaker for constructing, training, tuning, and evaluating ML models. Sagemaker supports a number of ML development frameworks and, according to one aspect, may use use Keras/TensorFlow. Additionally, system 300 can employ Sagemaker NEO to prepare the AI Logic 412 models for deployment to remote processors as illustrated is FIGS. 1-3, 6.

According to an aspect, GPU 410 can access graphical assets 414 that can be added to video that is being processed using network processor 402. GPU 410 can also access AI logic 412 that can include a variety of stored AI enabled logic that are designed to automate various aspects of autonomous video processing at remote processing system 400 and local processing system 300, camera 200, or various other processing systems and devices provided herein. For example, AI Logic 412 can be created using various videos created during a specific activity such as a golf activity, football activity, soccer activity, baseball activity, basketball activity, skiing activity, snowboarding activity, biking activity, fishing activity, boating activity, general sports activities, or various other types of non-sports activities that are predetermined to occur at a geographic location. AI Logic 412 can process the previously recorded image data within a video frame and can be used to tag objects within the video that are important or relevant to the activity. For example, a AI Logic 412 can be used to tag a football being used within a football field, but may not be used to tag a bird flying over the football field. Further, a football player's number and name can be processed and tagged in a way to aid in identifying video in which the specific player may be present and processed accordingly. AI Logic 412 that is created for a specific activity can be shared with a local video processing system or camera as described herein. In other forms, AI Logic 412 can be stored locally in remote video processing system 400 to be used or distributed as needed.

According to a further aspect, system 400 can be used to post processed video received from remote video interface 406. For example, a video may be modified or edited to add additional assets 414, or formatted using a specific format provided by format manager 422. As such, system 400 can employ additional software for post processing and editing including the use of Python and OpenCV for editing videos on AWS EC2 web servers. System 400 can also utilize a AWS Elemental MediaConvert to convert or format video prior to distribution using distribution manager/communications 408.

Figure 4B:
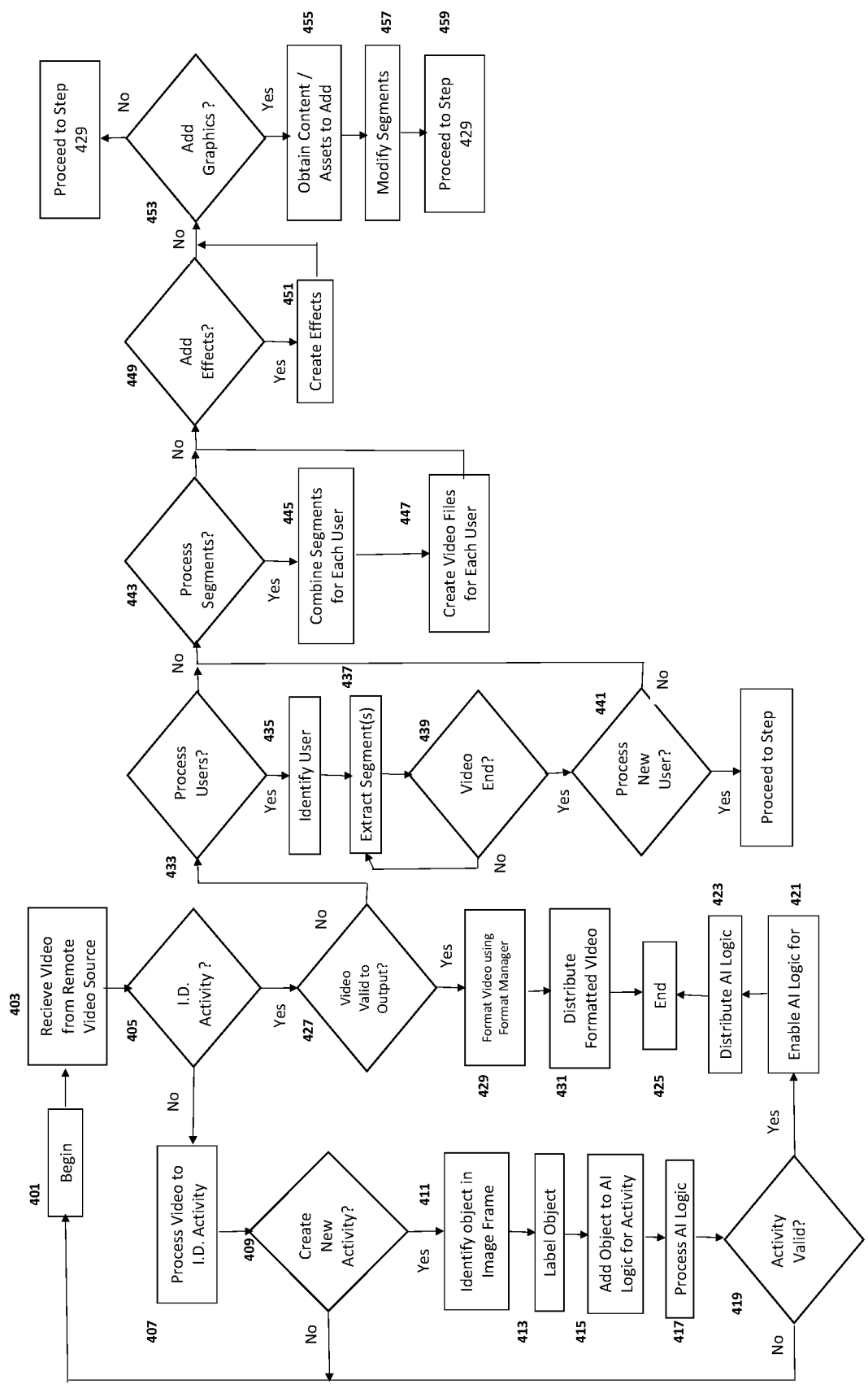
FIG. 4B is a flow diagram of a method for processing video using AI enabled remote video processing in accordance with an aspect of the present disclosure.

Referring now to FIG. 4B, a flow diagram of a method for processing video using AI enabled remote video processing in accordance with an aspect of the present disclosure is shown. The method may be used by one or more of the systems, devices, processors, modules, software, firmware, or various other forms of processing to carry out the method described in FIG. 4B. Additionally, FIG. 4B may be realized as within various portions of FIGS. 1-3B and 5-8, and in some aspects, may be modified to include various functions, uses, and features described therein.

The method begins generally at step 401. At step 403, when video is received form a remote video source, the method proceeds to step 405 to identify an activity within the video. Various activities as described herein can be stored within various AI logic that has been created using Machine Learning as a Neural Network. Portions of the video can be compared to the AI logic and if an activity is not detected, the method can proceed to block 407 and process the video to identify a new activity. In some forms, processing can include tagging or identifying objects within the video that are unique to an activity and can be used by the Machine Learning for one or more activity. Upon processing the video, the method proceeds to block 409 to determine if a new activity should be created within the Neural Network. For example, various activities as described herein can be identified but in some forms, a sub-activity within an activity category can be created as well. An example of this activity can include, in one form of a golf activity, a golfer slicing or hooking a ball, a golfer throwing a club, a golfer high flying another golfer, a golfer making a hole-in-one, or various other activities or sub activities that may be created. If an activity should be created, the method proceeds to step 411 and identifies the object or series of objects that can be used and exist within an image frame of the video. The method can proceed to step 423 and label the object(s) identified and then to block 425 where the object or frame can be added to the AI logic for that activity. In some forms, if the activity exists, the object can be added to the Neural Network of the activity, and in other forms, if the activity does not exist and a Neural Network is not available, the method can generate a new Neural Network and Machine Learning instance to be used within the AI Logic. The method then proceeds to step 417 and processes the AI Logic and to step 429 to determining if the activity is valid and can be released within the AI Logic. For example, the accuracy of a Neural Network can include dependencies on the number of objects identified and provided to the Machine Learning instance for that activity. If only one instance exists, the AI Logic will likely fail. As additional objects are identified and used within the Machine Learning instance, the AI Logic has a statistically better chance of identifying the activity. If additional objects for that activity are needed, the method proceeds to step 401 until additional video is received. If at step 419 the activity is now valid, the Machine Learning instance can enable AI logic for that activity at step 421, and proceed to step 423 to distribute the AI Logic to various locations as needed. The method then proceeds to step 425 and ends.

If at step 405 an activity is identified, the method proceeds to step 427 and determines if the video is valid to output or store. For example, a local video processor may have processed the video sufficient for distribution. As such, a remote video processor, such as system 400 can detect if the video requires any additional processing using data provided with the video. If the video is valid to output, the method can proceed to step 429 and format the video using a format manager. For example, a video may need to be formatted to be output to a mobile device or application having specific formats, file size, and other specifications required in connection with posting a video. Video provided to various locations and applications can include Facebook, Youtube, Instagram, Snapchat, and other applications. Each app being utilized may require it's own formatting for publishing into a specific network. As such, a format manager can determine one or more locations for the video and format accordingly. In other forms, the video can be processed to be distributed to a network location having a high definition or 4K video output on a stationary output device such as a specific monitor. Various types of formatting may be used for the video to output to various destinations. Upon formatting the video, the method proceeds to step 431 and distributes the formatted video using a distribution manager. For example, the video may be a single instance that is distributed to a cloud storage account configured to store the video. However in other forms, the video may have been formatted into multiple formats, thus creating multiple videos that may need to be distributed. As such, at step 431 the video is distributed to those destinations. The method then proceeds to step 425 and ends.

If at step 427 the video is not valid to output, the method proceeds to process the video. For example, the method includes 3 different types of processing that may be used to process the video and are provided in no particular order but only as a reference for illustrating processing of the video. At block 433, the method determines if one or more user processing needs to be performed. For example, a local video processor may have provided information for a specific user recorded in the video. As such, that information can be used to identify the user within the video. Various types of identification can be used including facial recognition, geofencing, GPS or Location Services location identification, grid identification, manual input from a mobile app of the user, or various other triggers that can be used to identify the specific user within the video. The method can also use AI Logic to identify the specific user and characteristics, details, and/or objects of that user can be provided with the video. Upon identifying the user, the method proceeds to step 437 and extracts segments of video as they relate to the user. For example, a user that is identified may be a football player having a specific jersey number and name. The method would locate all segments of the video where the football player is present, and extract those segments from other players. In another form, a golfer may be playing a hole on a golf course with other players and the video may include numerous other shots or activities taken by the other golfers. As such, the method can identify the specific user and activity within various segments of video and remove the segments that don't include the user. In this manner, a video of just the golfer can be created. Upon extracting the video segments, the method proceeds to step 439 to determine if the end of the video has been reached. If it hasn't, the method proceeds to step 437 and repeats. If the video has ended, the method proceeds to step 441 and determines if the video should be processed for a new user. For example, as mentioned multiple golfers or players may be a part of the same video captured. As such, when desired a new user can be identified at block 435 and the method can proceed as described above. In this manner, multiple segments that are unique to a specific user can be extracted from a single video thereby reducing the number of video uploads needed for processing. For example, on a football field, a single video can be uploaded and the method can extract the video footage for each player thereby creating unique video segments for each player that can be provided to each player, their teammates, coaches, and the like. Although at block 441 multiple users may be detected, the method may not desire to extract video segments for all users and may include a profile from a profile and content manager to extract only certain user's segments.

If at step 441 the method determines that no additional user segments should be extracted, the method can proceed to step 443. At step 443, the method determines if the segments require further processing. For example, if only a single segment of video is extracted, no additional processing to combine segments may be needed. If at step 443 the video segments require additional processing, the method proceeds to step 445 and combines the segments for each user into a single video. For example, the segments can be extracted and stored as portions of a video or video segments. At step 445, the segments can be combined together to create a single composite video for a user. Upon combining the segments, the method proceeds to step 447 and combines video segments for any remaining user to create a video unique to each user. As such, an individual participant can have their own video with segments created for their unique experience.

Upon processing the video if needed, the method proceeds to step 449 and determines if any effects need to be added to the video. For example, a content manager, such as the content manager 418 in FIG. 4 or other autonomous content manager, may identify a video of a golfer that was playing a certain golf hole at a resort such as Omni Barton Creek. The content manager may have stored an introductory video of a drone flyover of the golf hole being played and may add the introduction video to the user's video segment. In other forms, animated graphics illustrating the distance to the hole can be drawn from a tee box to the green from a 'top down' view of the hole. Other effects can also include adding audio or additional captured video of the user and other players at the activity. In one form, portions of a segment of the video may be identified or tagged to add a tracer to the movement of the ball as a part of creating effects. In other instances, AI Logic can be used to detect when a ball is located around the green in a location that is not desired by the golfer. In that instance, an augmented effect can be added to the video when a ball goes into the woods, a sand trap, a water hazard and the like. An augmented effect can include an animated video overlay. For example, an animation of a Loch Ness Monster stealing the golf ball as it enters the water hazard can be added to the video segment. Other animations can also be used and added as needed or desired. In this manner, an augmented reality can be added to the video for the user. According to a further aspect, the video may add a ball tracing effect to a shot made by a golfer. For example, the method can be used to identify a golf ball within the frames of the video and add a colored trace line to each frame to show the path of the ball. If the video includes video segments of the ball coming into the green, the trace can be added to the video as ball lands onto the green. In some instance, AI logic or image processing can be used to locate the ball in a frame and, in some cases, the video may be reversed after the ball is located on the green. For example, when a user approaches his or her golf ball on the green, AI logic or image processing can identify the user and add effects or other content prior to the user picking up the ball or addressing the ball. In this manner, through reverse processing of the video data, the ball can be traced back in previous frames or segments and the video can be modified for that specific user accordingly. In another form, an effect can include audio effects, music, or sound added to the video. For example, music can be added throughout all or portions of the video and can include various audio levels. Unique sounds can also be added to the video based on what is happening in the video. For example, a user may hit the ball into the woods and a 'chainsaw' sound, clapping sound, laughing sound, applauding sound or other sound effect can be added to the video segment. In another form, AI Logic or image processing can be used to identify when a golf ball goes in the cup and a 'ball dropping in the cup' sound effect can be added. Effects can be predetermined based on the activity or sub-activity identified by the AI logic. In this manner, the method can access a label within a video segment and automatically add the effect desired to portions or segments of the video.

After adding an effect if desired, the method proceeds to step 453 and determines if graphics need to be added to the video. If no additional graphics need to be added, the method proceeds to step 429 and ends. If additional graphics are to be added, the method proceeds to step 455 and obtains the content or graphics to be added from and assets resource such as assets 414 using content manager 418 of FIG. 4 or other asset or content resources as needed or desired. Assets or graphics can include one or more graphic to add to a video image or video segment. For example, graphics can include information such as the name of the golfer, the date, the golf course, the hole #, the distance to the hole, the club used by the golfer, current weather conditions, the max height of the ball or after it is hit, the speed of the ball after it is hit, the curvature of the ball during flight, the max distance the ball travelled, the current stroke or number of strokes taken, the par for the hole, other player info currently playing with, or other player information or course information as needed or desired. According to another aspect, the golf course can include graphical assets to be added to a segment of the video such as the name of the golf course, a logo of the golf course, the age or when established, the current pro's name, the owners name, or various other types of marketing assets or graphics that a golf course may desire to be added to a video segment. Although discussed as adding assets for the golf industry, other graphical assets can be added to the video as needed or desired. Upon obtaining the graphical assets the method proceeds to step 457 and modifies the segments adding the assets or graphics to specific video image or segments. The method then proceeds to step 429 where the method ends.

The method of FIG. 4B can be modified as needed to combine or remove various portions as needed. For example, upon identifying an activity or sub-activity at step 405, the method can be used to segment video and further process the video segments to identify a sub-activity. The segment can be labeled as having that sub-activity and a label can be further used to process the segments, add effects, add graphics, or various other types of processing of the video segment. In this manner, an automated process using AI Logic can efficiently edit and process a video without the need for having an individual modify and edit a video manually.

Thus, the system 100 may ultimately capture, process, and store videos of the activity for later provision to a user, such as via a user app 500.

Figure 5:
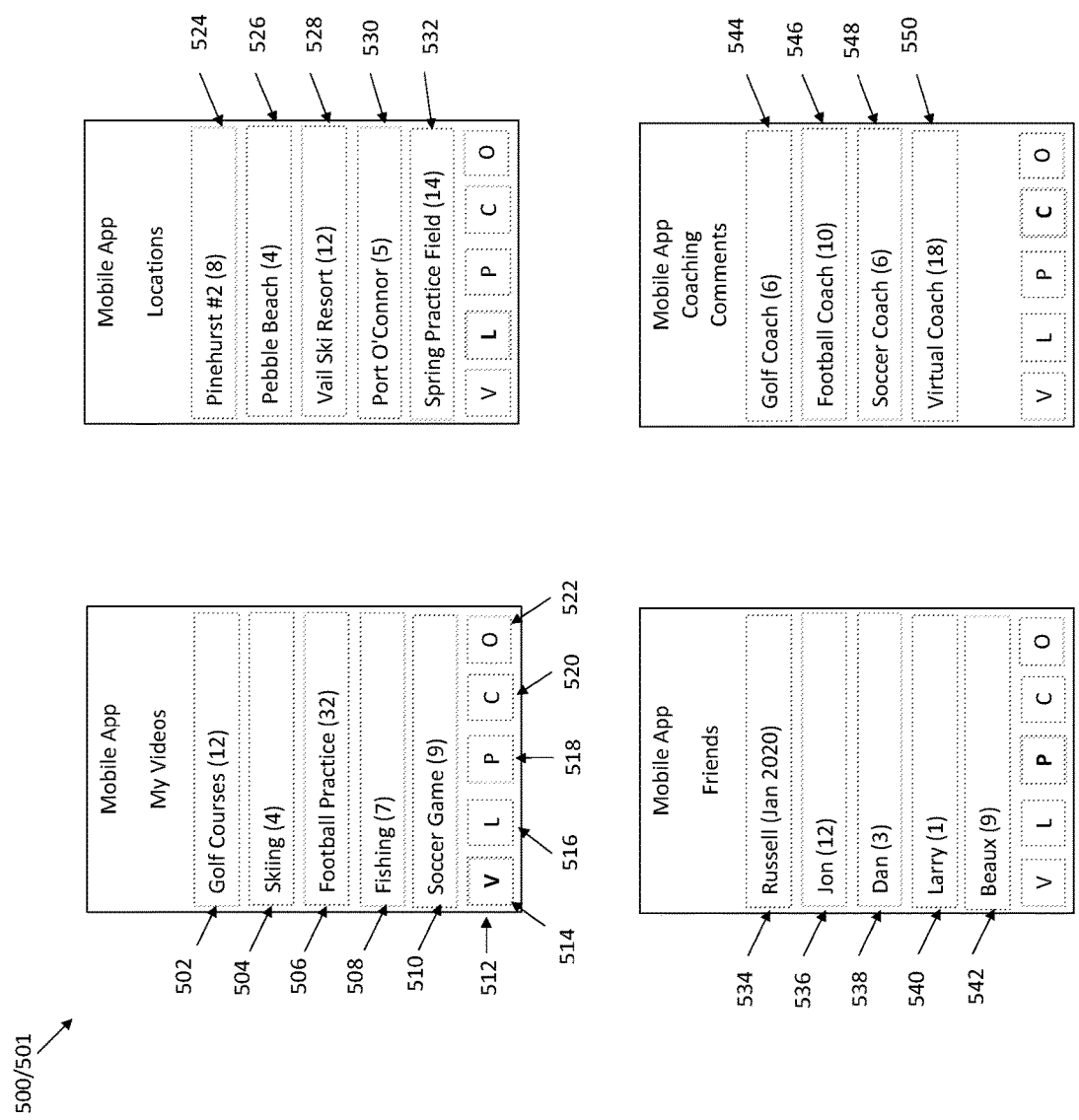
FIG. 5 is a user interface illustrating a mobile device application in accordance with an aspect of the present disclosure.

With reference to FIG. 5, a schematic representation of user app 500 and/or user phone 501 is illustrated, illustrating various screens and subscreens presented by the app 500 for visualization by the user. The app may include a plurality of soft buttons 514, 516, 518, 520, and 522, corresponding to user Videos, user Locations, user Friends, user's Coaching, and Other, respectively. By selecting the button 514 ("V" for Video), a list of videos categorized by event type may be displayed. As shown in FIG. 5, the categories may include golf courses 502, skiing 504, football practice 506, fishing 508, and soccer 510.

By selecting button 516, multiple location categories may be displayed. As illustrated in the example of FIG. 5, the locations may include first, second, third, fourth, and fifth locations 524, 526, 528, 530, and 532, respectively. The illustrated locations include golf courses, ski resorts, marine locations, and athletic fields, for example.

By selecting button 518, a list of the user's Friends on the app may be displayed, including first, second, third, fourth, and fifth friend categories 534, 536, 538, 540, 542. By selecting button 520, coaching comments may be listed according to category, including first, second, third, and fourth categories 544, 546, 548, 550.

It will be appreciated that additional buttons and corresponding subscreens may be used for other groups. Within each category, the app may display a quantity of videos within the category. The quantity may represent total number of videos, total number of unviewed videos, or other measure. In addition to organizing and displaying videos for the user, the app 500 may also communicate, via software/hardware of the phone 501, with other aspects of the system 100, either directly or indirectly.

Figure 6:
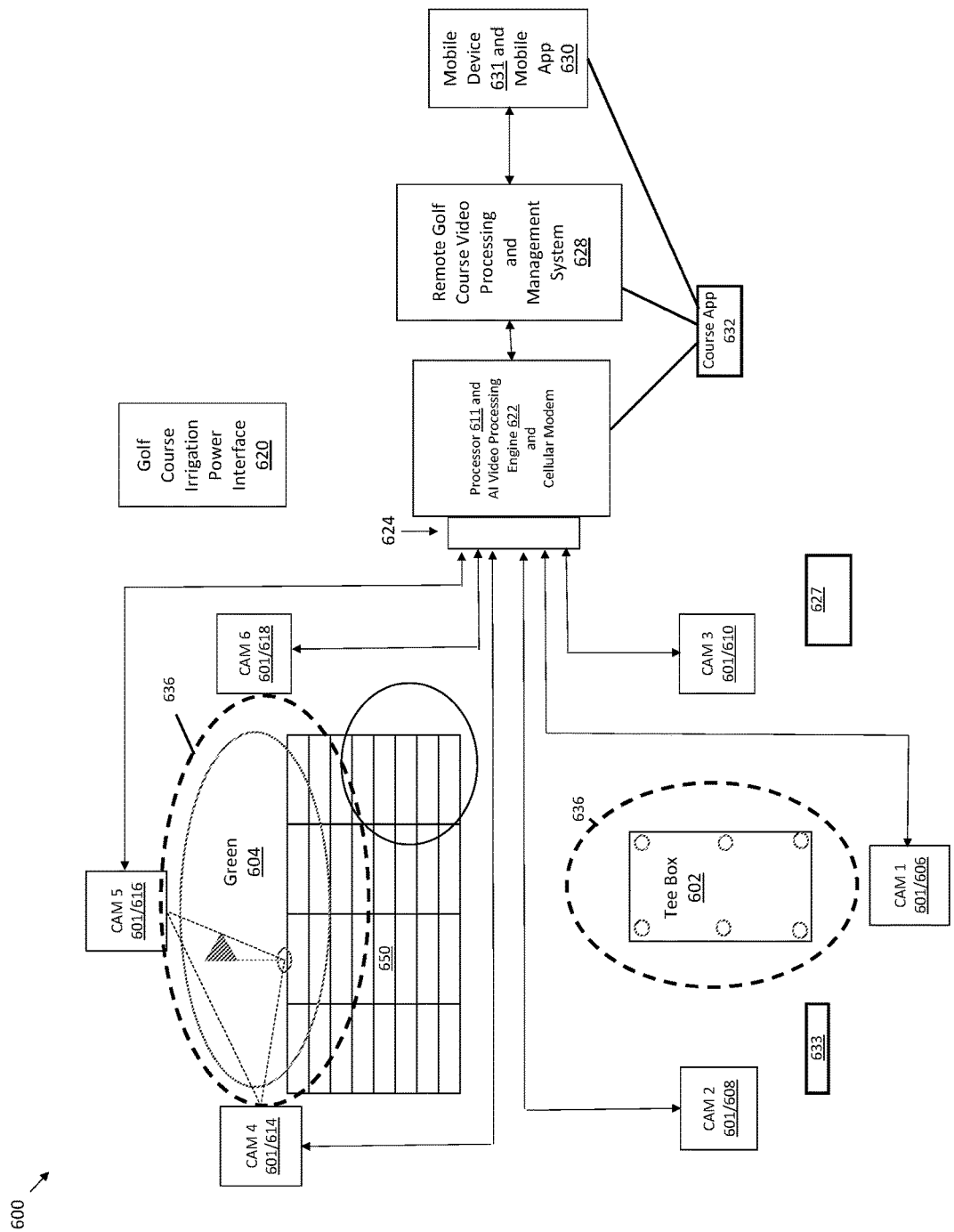
FIG. 6 is a block diagram illustrating one example of AI enabled video recording system disposed at a golf course in accordance with an aspect of the present disclosure.

Referring now to FIG. 6, a block diagram illustrating one example of AI enabled video recording system disposed at a golf course according to an aspect of the present disclosure is provided. The AI enabled video recording system, illustrated generally as system 600, is used to detect, record, and process golf activity at a golf hole having tee box 602 and green 604. System 600 includes cameras 606, 608, 610 that may be disposed adjacent tee box 602, with camera 606 disposed behind tee box 602, and cameras 608 and 610 disposed on opposite lateral sides of tee box 602. Cameras 614, 616, 618 may be disposed adjacent green 604, with camera 616 behind green 604 (and facing teebox 602), and cameras 614 and 618 on opposite lateral sides of green 604. Each camera is in communication with camera interface 624, which may include network switch 110 of FIG. 1, remote camera interface 304 of FIG. 3, or other interfaces capable of connecting remote cameras to processor 611. Interface 624 is connected to or integral with processor 611 and AI video processing engine 622. Processing engine 622 may be processing system 112 or system 300 described above, and may include modem 310 or modem 114.

Processing engine 622 may be connected to golf course irrigation power interface 620, which may provide power; however, other forms of power may be provided to power processor 611 and processing engine 622. Processing engine 622 may be in communication with remote golf course video processing and management system 628, which may be system 400. Video processing and management system 628 may be in communication with mobile app 630, which may be mobile app 500 described above. Mobile app 630 may be installed on mobile device 631. Mobile device 631 may be a mobile phone, tablet, smart watch, golf cart, pull art, push cart, powered "follow-me" carts, or any other mobile device. It will be appreciated that mobile app 630 may also be installed/embodied/accessible on other devices, such as traditional computers, internet browsers, or the like. Mobile app 630 may also include other features and functionality as described below. It will be appreciated that the various above-described systems may be integrated into system 600 in whole or in part, allowing for local and/or remote processing of video captured by the cameras. Such processing may be accomplished automatically based on data received by system 600 and determined using video or image processing and/or artificial intelligence. Further, various aspects and use of system 600 may be realized as methods and software capable of being used by system 600 or various components within system 600. As such, the description of FIG. 6 or elements thereof can be deployed as methods.

Various cameras have been described above in reference to different figures and aspects of the cameras. For the purposes of discussion, each of the cameras described above may be referred to generally as camera or cameras 601, which are illustrated generally in FIG. 6. It will be appreciated that a reference to camera(s) 601 may also refer to cameras 102-108, camera 202, cameras 606-618, or other cameras reference in this description.

During an initial setup, cameras 601 may be utilized to record or perform a 3D scan of the hole/golf course, such that different aspects of the course may be determined via image processing at processor 611. For example, processor 611 may be configured to detect the location and shape of a water hazard or sand trap/bunker, as well as the location of trees, different cuts of grass, structures, and the like. The result of the 3D scan may be stored at processor 611 for the particular hole, and may be used as a reference for later processing of ball flight.

As part of the initial setup, the heights of cameras 601 may be determined and entered into processor 611. This information may not be readily acquired from GPS or Location Services location information of cameras 601. The heights of cameras 601 may be manually entered, or may be detected using other sensors utilizing other measuring methods, such as lasers. Either by way of GPS coordinates or other measuring methods, distances between cameras 601 may also be measured.

Additionally, with positions determined for each of cameras 601 and a 3D scan of the hole, the setup may include establishing geofence 636 or other predetermined boundary assigned to the hole. Geofence 636 may be in the form of a boundary box or a complex curvature surrounding the hole, and may be made in reference to the established GPS coordinates of cameras 601. Geofence 636 may be utilized to detect when a golfer has entered the hole, by detecting whether the golfer's position is inside the boundary or outside the boundary of geofence 636.

Golfer detection may be based on a detected or transmitted location of the golfer, or via detection by cameras 601, or through other detection methods such as a sensor coupled with image processing software. According to another aspect, golfer detection may be based on receiving a signal from another transmitter, such as GPS or Location Services or RFID, Wi-Fi, Bluetooth, or the like, and may be transmitted via mobile device 631 or other transmitting device. In addition to detecting the presence of the individual golfers, similar transmitters may be provided on a golf cart or the like, to indicate the presence of one or more golfers. As described above, mobile device 631 may be a phone or other device, such as a golf cart, associated with the golfer. It will be appreciated that other detection mechanisms may also be used In addition to the 3D scan of the hole, the initial setup may include identifying via other marking methods the precise positions of various objects on the course. In one aspect, the installer may travel to the location of a specific object and mark that object with a specific GPS or Location Services location, thereby providing an additional reference point for that object. This may be repeated to mark various objects around the course. FIG. 6, for example, illustrates a hazard adjacent green 604.

Thus, system 600 may receive location information corresponding to cameras 601 and surrounding objects. In response to receiving this location information, system 600 may define geofence 636. Following definition of geofence 636, system 600 may automatically detect and/or determine when a golfer is present within geofence 636 and the golfer's location relative to cameras 601.

System 600 may further define location grid 650. Location grid 650, partially illustrated in FIG. 6, may be limited to the area within geofence 636, or it may extend beyond geofence 636. Preferably, geofence 636 is defined to be a space large enough to encompass a substantial portion of the area where the golf ball, and the golfer, are likely to be present while playing the hole/course. Of course, it will be appreciated that the ball flight of a golf ball is unpredictable, especially in the case of recreational golfers, and that a golf ball or the golfer who hit the ball may ultimately travel outside geofence 636 while playing the hole/course.

Grid 650 may be defined by a plurality of grid boxes, such as a 3'×3' box that is repeated across the entire hole or substantially the entire hole. Each grid box will have a fixed position relative to cameras 601, and grid boxes may be utilized to provide information to processor 611 about the specific location of the ball or the golfer while the hole is being played. The locations of the ball or golfer with reference to a specific grid box may be used during the image processing by processor 611 to provide the golfer with a specifically tailored video.

Accordingly, in response to receiving location information of cameras 601 and location information of environmental objects, system 600 automatically defines location grid 650. Following definition of location grid 650, system 600 may automatically detect the position of the golfer within location grid 650.

System 600 may include one or more mobile devices 631, which may include applications and associated memories/processors and may therefore also be referred to as mobile computing devices. For the purposes of discussion, mobile computing devices 631 are referenced as mobile devices 631. Mobile devices 631 have been described above as providing location and detection functionality for the golfers. However, mobile devices 631 may also provide other communication and control functionality. Mobile devices 631 are configured to communicate with processor 611 to provide various information about the golfer to processor 611 to enable processor 611 to properly monitor and record the golfer and the golf shot. Mobile devices 631 may include GPS or Location Services functionality, thereby indicating the location of mobile device 631 and the golfer that has mobile device 631 in their possession. Mobile devices 631 may also communicate with the cloud or remote based systems. It will be appreciated that any device having GPS or Location Services location capabilities, such as a GPS or Location Services watch, including one with yardage capabilities, can be employed for purposes consistent herein. The various functionalities of mobile device 631 described herein may also be provided by multiple mobile devices 631. For example, one mobile device 631 may be used for location while another mobile device 631 may be used for communication with cloud/remote systems to provide or receive other information.

In one aspect, for a group of golfers, each golfer may have their own mobile device 631 that is specifically in communication with processor 611. The communication between mobile devices 631 and processor 611 may be direct or may be via another communication relay. With mobile devices 631 in communication with processor 611, processor 611 may determine the specific location of each mobile device 631 and each golfer, and can thereby determine when one or more of the golfers has entered predetermined geofence 636 such that monitoring and recording should begin.

For example, when the group of golfers and their mobile devices 631 enter geofence 636, their mobile devices 631, which are detecting their location, can determine that the coordinates of mobile device 631 are within predetermined geofence 636. The coordinates of geofence 636 may be communicated and stored in mobile device 631, such that mobile device 631 may make the determination that mobile device 631 is within the predetermined geofence 636. Accordingly, mobile device 631 may then communicate to processor 611 that mobile device 631 is present within geofence 636. In this aspect, processor 611 is not actively monitoring for the presence of the golfer. Rather, processor 611 receives a signal from mobile device 631.

In another aspect, processor 611 may actively monitor for the presence of a golfer or mobile device 631. For example, mobile device 631 or other device may send a "ping" at predetermined intervals. Processor 611 may "listen" for the ping, and once the golfer and mobile device 631 are within a predetermined range of processor 611, processor 611 will determine that the golfer and mobile device 631 have arrived at the hole/course, such that monitoring and recording may be begin.

System 600 is configured to identify each specific golfer that is participating, and when each golfer is participating. Typically, golfers take turns hitting shots. While cameras 601 will record the shots that are occurring, processor 611 is configured to determined which shot belongs to which golfer, such that the specific shots can be associated with the correct golfer. Accordingly, processor 611 is configured to identify the golfer prior to each shot.

In one aspect, the golfer may indicate, via associated mobile device 631, that he/she is the one that is about to hit their shot. The golfer may indicate that it is their upcoming shot via a button displayed on mobile device 631. Alternatively, another golfer in the group may indicate via their mobile device 631 that a specific golfer in their group is about to hit their shot. Processor 611 may then associate the resulting shot with the indicated golfer. This type of golfer identification may be described as manual golfer identification.

In another aspect, the identification of the golfer about to hit their shot can be performed automatically by processor 611 and associated processors and software. In one aspect, facial recognition software may be used. In this approach, prior to hitting their shot, the golfer may stand in front of one of cameras 601, such that camera 601 may capture an image of the golfer and determine via the captured image which golfer of the group of golfers matches the recognized face. The golfers may have their face recorded prior to the round, such that processor 611 may access a database of the golfer's faces that are expected to participate.

In another aspect, the golfer may be identified by the clothes they are wearing. Typically, each golfer's clothing is unique within a group. For example, pants, shirts, hats, shoes, and the like may be recorded by each golfer and subsequently detected by camera 601 prior to a golfer hitting their shot.

In another aspect, processor 611 may utilize the location data of mobile devices 631 to determine which golfer is about to hit. For example, if one golfer is standing on the tee box and addressing the ball, and the other golfers are standing off the tee box or not addressing the ball, processor 611 may determine the particular golfer that is hitting the shot based on the locations of mobile devices 631.

In another aspect, the golfers may carry remote identifier 633 on their person, such as in a pocket, clipped to their belt, fixed to their hat, or the like. Remote identifier may be in the form of a GPS transmitter or a RFID tag. In the case of the GPS transmitter, remote identifier 633 may actively transmit location data of the golfer to processor 611, which will receive the transmission and detect the location of the golfer. In the case of an RFID tag, remote identifier 633 may be detected by processor 611, which may transmit radio frequencies to locate the positions of the golfers relative to processor 611 to determine the locations of each of the golfers.

In another aspect, system 600 may store the ending location of the ball of each shot, and subsequent shots played from the stored location may be strung together with the previous shot. Thus, even if a particular golfer cannot be identified at one time or another, system 600 may still determine that the shot belongs to that golfer based on where the shot originated relative to where a previous shot ended. In one aspect, such determinations may be made based on a location within a video frame or a location within grid 650.

Thus, in view of the above, system 600 is configured to identify each individual golfer prior to the golfer taking their initial shot from the tee box, as well as subsequent shots. Cameras 601 installed at the hole will record each of the shots and, based on the identification of each golfer, store each golfer's shot in a recording database with a unique identifier for each golfer, such that each golfer's shot can be later provided to the correct golfer.

As is typical, the resulting shot from each golfer will be unique. It will be appreciated that a number of factors are present that affect the result of a shot, including the golfer's swing, positioning, wind speed and direction, and the like. Accordingly, the resulting locations of each golfer's shot may be located at various positions on the hole, typically closer to the green than the tee box. Thus, recording of subsequent shots for each golfer can include recording from multiple cameras.

Cameras 601 may be configured to include zoom functionality, including one or both of optical zoom and digital zoom. Cameras 601 may be further configured to have tilt and pan functionality such that cameras 601 may be pointed at an identified target. Cameras 601 may each be pointed and zoomed at the golfer attempting their shot, including their initial shot as well as subsequent shots up to and including the final shot of the hole.

In an alternative aspect, one or more of cameras 601 may have a fixed viewpoint without tilt, pan, or optical zoom. In this aspect, cameras 601 may be configured to capture everything within its view. The video may be provided or analyzed as a whole, or segments/windows of the view may be isolated or cropped to isolate a particular golfer or shot being played. The same video image may therefore be used for more than one golfer that are within the view of camera 601 at the same time.

After initial tee shots, system 600 is configured to determine and identify which of the golfers will hit the subsequent shots. Typical golf etiquette and rules dictate that golfers shall take their shots as determined by which golfer's ball is furthest from the pin. Recreational and professional golfers typically adhere to this convention; however, exceptions are common, especially in a recreational setting. Many golf courses encourage players to play "ready golf" in which the first golfer that is ready to hit shall take the next shot, even if that golfer's ball is closer to the hole than others. This practice can typically result in a more efficient completion of the hole and pace of play, allowing the golfers to complete the hole more quickly and allowing golfers playing behind to have an opportunity to play the hole sooner.

Accordingly, system 600 is configured to determine which of the golfers will be hitting the next shot, such that cameras 601 may be pointed and focused on the correct golfer to record the next shot.

For each shot taken by each golfer, cameras 601 record the shot and determine, based on the recorded video, the location of each ball within location grid 650. System 600, having identified the golfer for each shot, thereby will correlate the location of the ball and the golfer who hit the ball. Accordingly, system 600 may determine for each golfer where the next shot will occur. Similarly, system 600 may determine for each ball on location grid 650 which golfer will be hitting each ball. Thus, system 600 determines both the location of the ball and the identity of the golfer.

System 600 may be configured to control which golfer will hit the next shot, or identify which golfer is about to hit the next shot. In one aspect, processor 611 may communicate with the golfer to alert the golfer that it is their turn to hit their next shot. In one aspect, an alert or signal may be sent to golfer's mobile device 631. The alert may be in the form of an audible alert, a visual alert (such as a graphical representation on the screen of the mobile device), a haptic alert (such as by activating a vibration function of mobile device 631), or a message (such as an SMS text message or the like). In this approach, the golfers may be aware that processor 611 will be instructing which golfer is due to take their shot. Processor 611 may send alerts to each of the golfers at the same time, indicating an order of play, such that the golfers are alerted as to which golfer will be next to hit after the presently hitting golfer is finished.

As described above, processor 611 is configured to monitor and detect the location of each golfer, so by controlling which golfer is due to hit, cameras 601 may therefore be directed toward that golfer to record the shot. Cameras 601 may also zoom in on the golfer that is hitting the next shot.

In another aspect, processor 611 may determine which golfer is about to hit the next shot based on the movement of the golfers relative to the ball. For example, if one of the group of the golfers is positioned within a predetermined distance, while the rest of the golfers are positioned further away, processor 611 may determine that the golfer near his ball is the golfer that is about to hit. In response to this determination, processor 611 may instruct the cameras to be pointed at this golfer, and cameras 601 may zoom in on the golfer.

The relative distance between the golfers and their respective golf ball locations may be determined using grid 650. For example, if a golfer is positioned within the same grid square or an adjacent grid square to the previously determined location of the balls, processor 611 may determine that this golfer is the one that is about to hit. Processor 611 may compare the relative distances between the golfers and their respective ball locations and determine that the golfer closest to his ball is the one that is about to hit. The golfers may be instructed to remain a predetermined distance away from their balls when they are not planning to hit to assist processor 611 in making the determination.

Accordingly, system 600 may be configured to signal to the golfers which golfer is to be next to hit, and/or system 600 may be configured to determine based on the positions of the golfers relative to their respective ball locations which golfer has decided to hit next. In both cases, system 600 may be configured to focus cameras 601 on the correct golfer such that a recording of the golfer and the upcoming shot is properly recorded and stored.

This process may be repeated for each successive shot being played on the hole by the various golfers on the hole. In some instances, the same golfer may take more than one shot before another golfer takes his next shot. The process may be repeated until the completion of the hole.

During the play of the hole, cameras 601 may be configured to be constantly recording, and processor 611 may be configured to tag specific times of the recording to correspond to the various golfers and shots being taken, such that the recording may be divided and spliced together in accordance with the identity of each golfer and each shot taken. Alternatively, the recording may be started and stopped for each shot that is taken, and each individual recording may be tagged and later spliced together for each individual golfer.

System 600 may include a local video storage (not expressly shown in FIG. 6) such as AI enabled digital video recorder 312 or memory 303 illustrated in FIG. 3, in communication with the processor 611. Alternatively, remote video storage may be used, such as cloud storage and services 404 of FIG. 4. Processor 611 may communicate with video storage via Wi-Fi, cellular data, radio communication, or the like. Processor 611 may also communicate via a communication cable to a remote server or other communication device that communicates with video storage.

Processor 611 may further include or be in communication with image processing system/module 112, 300, 118, 400 that is in communication with video storage for the recorded video and splice together the various recordings of each shot assigned to each golfer. With reference to FIG. 6, processor 611 is in communication with local AI video processing system/engine 622 and remote processing system 628. Video processing system/engine 622 may include its own database for storing the video recordings and formatting the video recordings. The image processing systems/module 622, 628, 112, 300, 118, 400 may be included with the processor 611, or may be a separate module, as illustrated in the various figures. The image processing systems/modules 622, 628, 112, 300, 118, 400 may begin processing the images immediately upon the completion of each shot, appending the assembled recording with each additional shot, or processing may occur after video recording is over.

System 600 may be further configured to determine based on the location data of the golfers (via mobile devices 631 or other locating mechanisms) and geofence 636 boundary when the golfers have left the hole. In response to determining that the golfers have left the hole, processor 611 may provide one or more of the recordings that were spliced or segmented, assembled or combined, and processed and formatted and communicated to the golfers. In one aspect, each golfer may receive, at their mobile device 631 or other device, the recording of their specific shots. In another aspect, each golfer may receive all of the recordings of their group and may select which of the recordings to view.

In a preferred aspect, the recordings are provided to the golfers after the completion of the hole and after the golfers have left the hole to encourage the golfers to vacate the hole such that trailing golfers may play the hole. However, in another approach, the recordings or portions of the recordings may be provided to the golfers shortly after the completion of each shot. In another aspect, the recordings may be provided to the golfers after they have finished their round and entered another location on the golf course, such as the pro shop, restaurant, bar, clubhouse, locker room, or parking lot.

In one aspect, system 600 may be configured to automatically upload the assembled recording of the golfer to the internet in addition to providing the recording to the individual golfers. Alternatively, the recording may be uploaded to the internet instead of being provided directly to the golfer.

In one aspect, the recording may be uploaded to a specific account associated with the golfer corresponding to each golfer-specific recording. For example, the recording may be uploaded automatically to one of the golfer's social media accounts. Each golfer may have a user account associated with system 600. For example, via app 630 installed on golfer's mobile device 631, the golfer may enter various identification data, such as the golfer's name, address, email address, payment information, photograph, and other identifying characteristics of the golfer. The golfer may also provide their social media accounts and permission for the app installed on mobile device 631 to post information to their linked social media accounts. In one aspect, the golfer may enter their biographic information and social media accounts into a database associated with processor 611, rather than entering this information in the app installed on mobile device 631.

In one aspect, the golfer may choose whether to upload the recording to their social media accounts. The golfer may choose either before or after the recording whether the recording will be automatically uploaded. The golfer may also choose to manually control whether the recording will be uploaded automatically.

The inclusion of multiple cameras 601, in this case cameras 601 positioned near both the green and the tee box, allows for each shot to be recorded from multiple angles. Accordingly, the image processing software may splice together more than one angle of each shot. System 600 may determine whether only one angle should be shown, depending on the distance away from cameras 601 and ability of cameras 601 to zoom in on the particular golfer. In some cases, the golfer may be behind a structure or other obstruction, such that one of the angles is preferable to another. In some cases, the golfer may be too far away from one of cameras 601 for a desirable recording. For example, when the golfer is putting or near the putting green, camera 601 near the tee box may not provide a desirable angle. However, when the golfer is hitting from the tee box, while the golfer may be far away, the ball flight may result in the ball landing near the camera 601 at the green, and therefore the angles from both the tee box and the green may be used. In another case, the golfer may be generally midway between the tee and green, and therefore the angles from both cameras 601 may be desirable.

The above-described aspects provide for the ability to perform "un-manned" or autonomous videography of golfers, similar to the video recordings of golfers competing on television.

System 600 may be further configured to add graphical elements to the recordings of the golf shots for entertainment and evaluation purposes.

In one aspect, system 600 may be configured to analyze the images captured by cameras 601 and processed by video processing systems/modules/engines 622, 628 (or 112, 118, 300, 400) to provide additional image enhancements to the recorded video. For example, system 600 may include "tracer" software that will provide a visual indication of the flight of the ball. For example, in many television broadcasts of professional golfing events, when a golfer strikes a ball, a colored line trails the ball and leaves a colored path of the ball flight on the image being broadcast. The curvature of the path is provided on the broadcast image showing how the ball may have travelled, hooked, sliced, faded, or the like. The tracer software may determine the speed of the ball, the distance the ball travelled, the apex or height of the ball during the shot, or other aspects.

These images with the tracers included in the video or recording provide a more robust accounting of the flight path of the ball than is typically possible for the typical viewer, especially once the ball has traveled a relatively far distance from the camera. In broadcasts without the tracer, it is sometimes difficult to pick up the path of the ball in the latter portion of the ball flight, and the broadcast will often switch to a different view, showing the landing area of the ball, leaving the viewer with incomplete information of how the ball traveled. Video processing systems 622, 628 (or 112, 118, 300, 400) associated with system 600 may therefore provide the user with more complete information related to their golf shot relative to images without the tracer.

Other graphical representations may be added to the flight of the ball in addition to tracing the path of the ball. For example, depending on the speed, distance, or ball flight, the flight path may be color-coded to indicate a particular achievement. For example, if the ball travels above a certain speed, a red or "hot" color may be applied to indicate a high speed, or a flame-graphic may be added as a tail to the ball. Similarly, if the ball flight is within a range of being considered "straight," a green color may be applied to the ball flight to indicate the lack of a hook or slice. Conversely, if the ball flight is not straight, another color, such as yellow or red, may be applied to the ball flight to indicate a less than ideal shot. It will be appreciated that these graphical additions based on the ball flight may be tailored to provide various colors or graphical representations. In one aspect, the golfer may indicate, via the mobile device 631, the type of indicator they would like to have displayed. The type of indicator may be toggled, such that multiple types of indicators may be applied to the same recording.

Graphical elements may also be added to the recordings based on the location of where the ball landed at the conclusion of each shot. As described above, system 600 may include location grid 650 that is associated with the topography of the hole. For example, each grid square of location grid 650 may be correlated with a topographical aspect of the hole. Select squares may be associated with a bunker, water hazard, out of bounds, in the woods, on the fairway, in the rough, on the green, etc. System 600, cameras 601, and processor 611 may determine based on the recording and the flight of the ball where the ball ended up within grid 650 and, accordingly, the type of location where the ball ended up. Based on the location of the ball, system 600 may add a graphical element.

For example, if the ball is determined to have landed in a water hazard, a graphical element, such as a sea monster, may be added to the recording at the location of the ball. Similarly, a splash illustration may be added, or a snorkeler, or the like. If the ball is determined to have landed in a bunker or sand trap, a beach ball or beach umbrella may be added to the recording in the location of the ball. If the ball is determined to have landed in the rough, a lawnmower illustration may be added to the location of the ball. If the ball is determined to have landed in the woods, a squirrel or bear may be added that approaches the ball and appears to run away with it. If the ball lands on the green, sometimes referred to as "the dancefloor," an illustration of a dancer or disco ball may be added. It will be appreciated that various other types of ball locations and corresponding animations or illustrations may be applied based on the location. System 600 may include multiple animations for the same type of location, such that each instance may be a relatively unique animation. The animations may be randomly assigned based on the type of location, or they may be cycled for identified golfers such that repeat animations are limited.

Location grid 650 may also be used for additional purposes. In one aspect, location grid 650 may be used to help a golfer locate their ball. In many cases, a golfer may have trouble seeing the flight of their ball after a shot, and may not know where ball is located. Processor 611 may provide the location data of the ball to the golfer such that the golfer does not have to spend additional time searching for the ball's landing spot. Thus, the golfers may be able to complete the hole in a more efficient manner, improving the pace of play.

Similarly, based on the location of the ball within the grid and the location of other features of the hole that are correlated with location grid 650, system 600 may provide additional information to the golfer regarding his upcoming shot. For example, processor 611 may communicate to the golfer the distance to the pin at the conclusion of the shot, allowing the golfer to consider which club to use for their next shot prior to arriving at the ball's location. System 600 may provide other distance based information, such as the distance to other features of the hole, such as the distance necessary to clear a water hazard or bunker, or the distance to a particular area of the green.

As described above, location grid 650 may be overlaid on the hole, which includes green 604. Accordingly, system 600 may also be configured to operate as a virtual caddie to assist the golfers with putts. System 600 may include various information about the green that is stored in memory 303, cloud storage and service 404, or other database storage in communication with system 600. For example, the various undulations of the surface of the green may be stored, which may be referenced to determine the expected break on a particular putt. For example, processor 611 may communicate to the golfer that an upcoming putt will break 3 inches to the left. Processor 611 may indicate whether the putt is uphill or downhill. Additionally, processor 611 may store various recordings of putts made from various locations on the green and aggregate these putts to use artificial intelligence to determine how putts travel from certain locations on the green. For example, the temperature, wind, moisture, and grain direction can affect how a putt travels that is not readily apparent from the shape of the green, and can change over time and weather conditions. By analyzing the results of recorded putts from different locations, processor 611 may utilize this data and update its recommendation for different locations. In one aspect, location grid 650 associated with the green may have smaller grid squares to provide more accurate location data to provide the virtual caddie assistance.

System 600 may further be used to automatically identify the brands being used by the golfers. Similar to the facial recognition described above, processor 611, via cameras 601, may identify the brand of golf club the golfer is using, or the brand of clothing the golfer is wearing. Processor 611 may utilize the image recognition ability to identify logos, patterns, trademarks, or the like associated with different brands. In response to identifying the brands associated with each golfer, processor 611 may be configured to communicate with the golfer to provide information regarding the brands, such as new products, product offers, or alternative products.

System 600 may also include the ability to integrate various software applications that may be used by the golfer or the golf course owner. Mobile device 631 may include user app 630 that may be operated to indicate a location of the user relative to the golf hole, which may be performed manually or automatically. As described above, system 600 may automatically determine that the golfer has arrived at a particular golf hole. User app 630 may also be used to manually signal to processor 611 that the golfer has arrived at the hole. Similarly, user app 630 may provide a notification to the golfer that they have arrived at a hole where recording is available. User app 630 may provide other functionality, such as allowing the golfer to decline that their shot will be recorded.

The proprietor of the golf course where system 600 is used may also have a dedicated application that interfaces with processor 611. This application may be referred to as a course app 632. Course app 632 may be configured to communicate with user app 630. Course app 632 may allow for the golf course to register the golf course as a course that includes the recording capability. User app 630 may receive information from various golf courses that register, providing end users with information about which courses are available that provide the recording capability.

Course app 632 may communicate with user app 630 to provide a notification to the course that an interested user is on-site. An alert may be provided via course app 632 that a user or group of users has arrived, and that the users are interested in using the technology. Similarly, user app 630 may provide an alert to a golfer that a nearby course or the course at which the golfers are preparing to play includes the recording capability.

User app 630 may also provide the ability to request recording in the middle of a round. In another approach, course app 632 may be used by the golf course during golfer check-in to provide the service for interested golfers. However, it can be the case that a golfer may change his mind regarding whether or not to record a shot. Accordingly, providing the ability in user app 630 to request recording or decline previously requested recording may ensure that user needs are met.

User app 630 may also provide a mechanism for paying for particular features of a shot either before or after the shot is recorded. For example, in the event a shot is recorded, the recording and image processing has the ability to provide the above-described tracer technology to the shot to show the path of the ball. This may be considered an added feature, and the user may choose after hitting the shot whether or not to apply the tracer technology. However, in another aspect, the tracer technology may be applied regardless of user input. User app 630 may provide the ability to have the tracer turned on or off on demand.

User app 630 may communicate with other user apps 630 for other golfers. For example, each of the members of a particular group of golfers may have their user app 630 active, with each of the golfers having their shot recorded. The shots of each of the golfers may be aggregated by one or more of user apps 630, providing a composite of the shots for each golfer. The shots may be overlaid on each other or displayed one after the other. User app 630 may provide other functionality among the group of golfers, such as the location of each golfer on the course, each golfer's distance to the hole, etc., which may provide for desirable benefits among the group for competitive or entertainment purposes.

According to an aspect, user app 630 may provide further camera/recording control by the golfer to tailor the recording as desired. In one aspect, the golfer may use user app 630 to activate video recording using a record button displayed via app 630 or otherwise provided on mobile device 631, which enables cameras 601 to record the golfer. In a related aspect, a stop button may be similarly provided that disables cameras 601, for example while the golfer is reading the green.

In another aspect, recording of the golfer may be automatically stopped according to predetermined programming. In one aspect, geofence 636 and/or position sensing technology may be used in combination with the above-described manual activation to turn off cameras 601 if the user forgets to stop the recording.

Note that not all of the activities described above in the general description or the examples are required, that a portion of a specific activity may not be required, and that one or more further activities may be performed in addition to those described. Still further, the orders in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Figure 7:
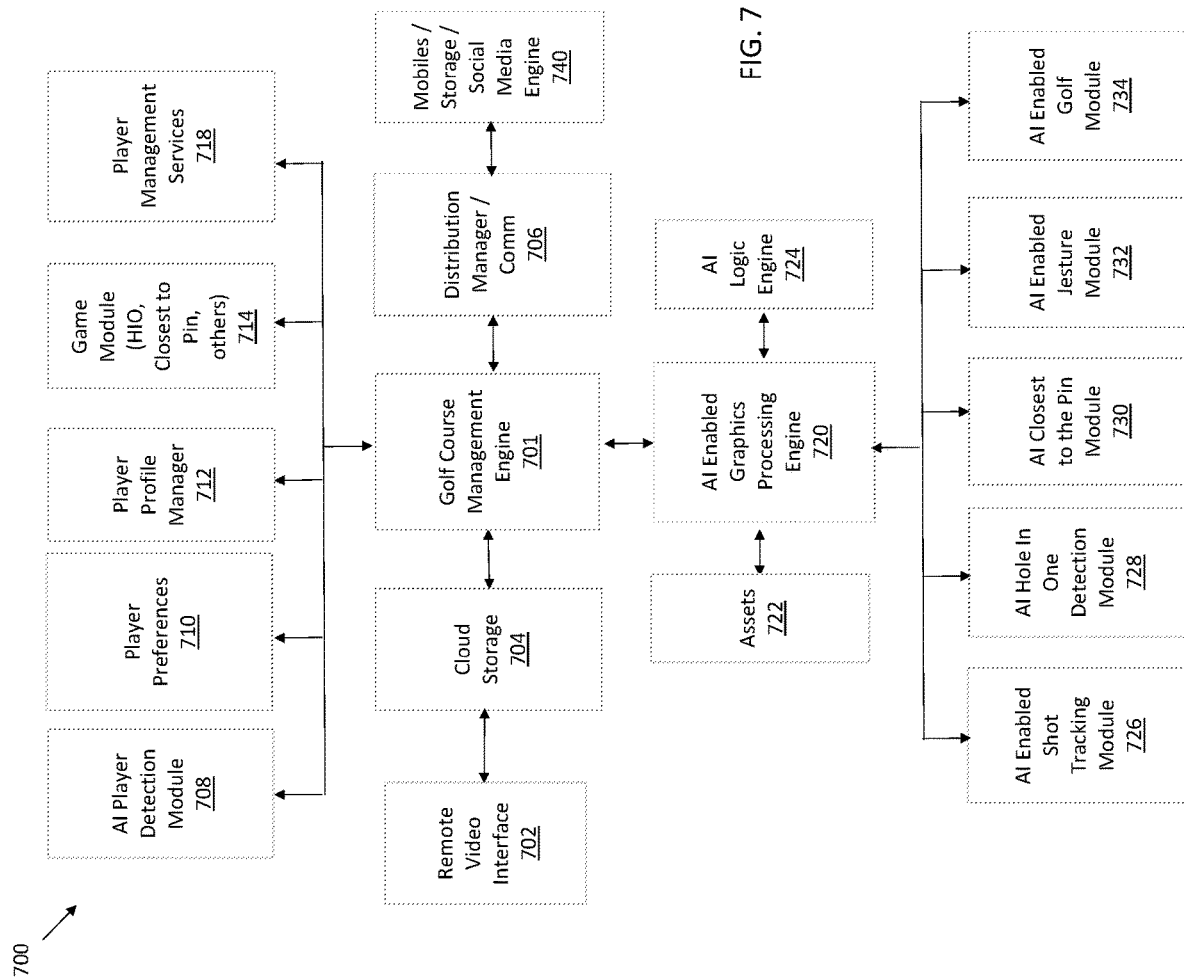
FIG. 7 is a block diagram illustrating one example of an AI enabled remote golf course video processing and management system in accordance with an aspect of the present disclosure.
Figure 8:
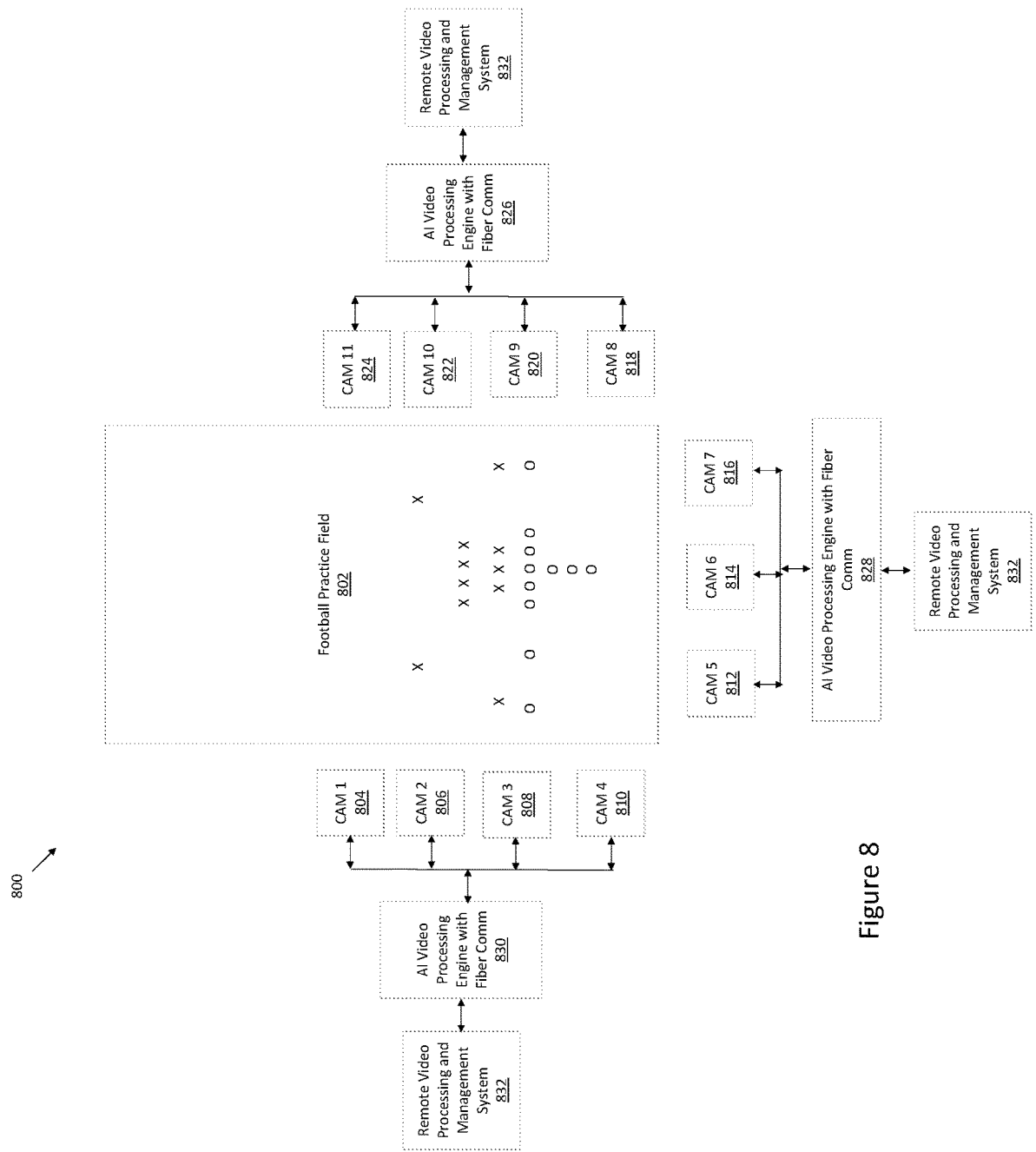
FIG. 8 is a block diagram illustrating one example of an AI enabled video recording system disposed at a football field in accordance with an aspect of the present disclosure.

The above-described system 600 may be embodied as a group of associated components that are controllable by processor 611 and software associated therewith. System 600 and various aspects of its use may also be embodied as a methods that utilizes the above-described functionality to automatically provide the end user with the benefits described above. System 600 may include various associated software modules that may be implemented using processor 611 or remotely and in communication with processor 611. The modules or methods may include various artificial intelligence and machine learning and image processing to automatically process the various images and provide the desired output to the end user. FIGS. 7 and 8 below illustrate examples of providing a method that can be used to automatically record and process video for a golf activity in accordance with aspects of the disclosure.

The above-described systems and methods may be applied to a variety of activities, sports, events, and the like. For purposes of discussion, system 100 will be referenced for use with these other activities, but it will be appreciated that the other aspects and systems described above may also be used according to the desires of the user and the feasibility of local/remote processing.

In one aspect, system 100 may disposed on a traditional rectangular athletic field, such as a field commonly located at various high schools, colleges, municipal parks, and the like, and may be configured for allowing various types of athletic events to be performed. For example, such a rectangular field may be used for football, soccer, lacrosse, field hockey, rugby, and the like. Each of these types of events includes a goal area disposed at opposite ends of the fields, and may include one or more scoring mechanisms. Each of these types of fields includes a playing surface bounded by lines and other marks on the field to indicate the competition area. The cameras, the functionality of which has been previously described, can be disposed about the competition area and focused on areas of particular importance. Additionally, as further described below, the cameras may be configured to be automatically controlled based on object and gesture recognition, using artificial intelligence and object/gesture mapping. The cameras may be configured to automatically change their area of focus, and may be configured to automatically track certain objects, such as players or the ball being used. System 100 may be configured to automatically process the images captured by the camera and automatically output an edited video production for further distribution or display, such as on the internet or via mobile devices, such as mobile phones. System 800, illustrated in FIG. 8, provides one example of such a system.

For example, in football, points may be scored by reaching the end zone, and may also be scored by kicking the ball through field goal posts fixed on the field. The cameras may be placed at each corner of the field, in one aspect. In another aspect, the cameras may be placed near the end zones. In one aspect, the cameras may be placed on the goalposts. In one aspect, cameras may be disposed at midfield. Cameras may be placed on both sidelines of the field. Cameras may be configured to automatically follow/focus on the players and/or ball, and may be configured to focus on predetermined portions of the field. The cameras may be configured to automatically detect a penalty flag and may focus on the referees.

For another example, in soccer, the cameras may be placed at each corner and at midfield. Cameras may further be placed on the goals. Cameras may be configured to automatically track the players and the ball. Cameras may be configured to automatically detect a red/yellow card issued by the referee, or substitutes waiting to enter the field of play.

For another example, in lacrosse, cameras may be disposed at the corners of the field and at midfield, or near the goals. Cameras may be configured to automatically monitor the players, referees, and/or the ball.

For another example, in field hockey, cameras may be disposed at the corners of the field and at midfield, or near the goals. Cameras may be configured to automatically monitor the players, referees, and/or the ball.

For another example, in rugby, cameras may be placed at each corner of the field, in one aspect. In another aspect, the cameras may be placed near the end zones. In one aspect, the cameras may be placed on the goalposts. In one aspect, cameras may be disposed at midfield. Cameras may be placed on both sidelines of the field. Cameras may be configured to automatically follow/focus on the players and/or ball, and may be configured to focus on predetermined portions of the field.

It will be appreciated that other events occurring on such an athletic field may also be automatically monitored and recorded.

In addition to the common athletic field described above, other athletic field types may also include system 100.

In one example, system 100 may be disposed at a baseball field. Cameras may be disposed at the foul poles, at center field, at first and third base, at the dugouts, and/or behind home plate. Cameras may be configured to focus initially on predetermined areas, such as each position on the field, or in particular on the pitcher and the hitter. The cameras may be configured to automatically detect and the follow the trajectory of a pitched ball, a batted ball, or a fielded and thrown ball.

In another example, system 100 may be disposed at a cricket pitch, with cameras disposed at various locations around the pitch and configured to automatically detect and monitor the participants in a manner similar to baseball.

It will be appreciated that the various athletic events and/or locations may often be conducted either indoors or outdoors, as is known, and the various descriptions herein shall not be interpreted to be limited to indoor/outdoor.

In another example, system 100 may be disposed at a basketball court. Camera may be disposed at each corner of the court, at midcourt, and/or near the baskets. Cameras may be disposed adjacent the bench or the scorer's table. The cameras may be configured to automatically monitor and record the players, the ball, the coaches, referees, etc.

In another example, system 100 may be disposed at an ice-hockey rink. The cameras may be disposed above or in the line with the boards, at each corner, behind each goal, at the benches, the penalty boxes, and the like. The cameras may be configured to automatically monitor and record the players, referees, linesmen, coaches, etc. The cameras may be configured to automatically monitor and record the goalies in particular. The cameras may automatically focus on different areas of the ice depending on detected states of the game, such as a power play or penalty kill, or if the goalie has gone to the bench for an extra attacker.

In another example, system 100 may be disposed at a ski and snowboard area. Cameras may be located at various points along the slopes, including at the top and bottom of chairlifts and other user-conveyance systems, as well as at various support posts thereof. Cameras may also be disposed on trees, rocks, and the like. In the case of a halfpipe or other recreational area in which tricks, jumps, and the like are performed, cameras may be disposed around such areas. Cameras may be configured to automatically monitor and focus on individuals or groups of skiers and snowboarders as they proceed through the various areas.

In another example, similar to the above ski/snowboard example, cameras may be disposed at various locations around a skate park where skateboarding is performed. The cameras may be configured to automatically monitor and focus on different skateboarders as they proceed through the area.

In another example, system 100 may be disposed at a fishing area. The cameras may be located at various locations surrounding the lake, pond, pier, bay, or the like to automatically monitor and record the actions of the fishing enthusiasts. In one aspect, cameras may also be disposed on a fishing boat for automatic monitoring and recording of the athletes.

In another example, system 100 may be disposed around a racing area, such as automotive racing or boat racing. The cameras may be disposed at various locations around a track, course, or racing area, and may be configured to automatically monitor and record the movements of the vehicle. In the case of boat racing, cameras may be disposed at various locations on the boat to automatically monitor and record the various activities of the crew.

In another example, the system 100 may be disposed at a tennis court (or pickleball court). The cameras may be placed at each corner, at the net, behind the baselines, and the like. The cameras may configured to automatically monitor, track, and record the players and the ball during play.

In another example, the system 100 may be disposed along a cycling path, either recreational or competitive. The cameras may be disposed at various locations along the path, and may be configured to automatically monitor and record the cyclists.

In another example, the system 100 may be disposed at a boxing ring or mixed martial arts ring. Cameras may be disposed at various locations around the ring, for example at the corners and at various elevations. The cameras may be configured to automatically monitor and record the actions of the athletes during such competitions.

In another example, the system 100 may be disposed at a swimming pool. Cameras may be disposed at various locations along the length of the pool, and may be further disposed at each end of the various swim lanes. The cameras may be configured to automatically track, monitor, and record the actions of the swimmers.

It will be appreciated that system 100 may be disposed at further locations, areas, fields, courts, and the like to automatically monitor, record, and track the participants and other associated aspects of the event, such as a ball or other equipment disposed at the area and in use in the competition or event.

As described above with reference to FIG. 4, various activities may be identified and stored, and may be used to later identify similar activities when processing further video.

As described above, system 100 may be configured to use AI capable of machine learning and object/gesture identification based on an image data set. An image data set is a set of previously identifies objects, activities, gestures, or the like, that the AI can automatically identify from video. The image data set may include a list of known objects and/or movements, and an AI engine (such as AI Enabled Graphics Processing Engine 720 described below, Engine 622 described above, or other AI Video Processing Engines described herein) may be used to identify a threshold quantity of known objects based on captured images, such that further instances of one or more of the known objects in the data set may be automatically identified by the AI Engine without requiring manual/human identification after the image data set is defined. For purposes of discussion, AI Engine 622 will be referred to, but it will be appreciated that the other AI Engines described throughout the specification configured to automatically detect aspects of video may also be used to provide the functions and capability described herein.

For example, at an initial time in the establishing of the image data set, a series of images may be analyzed manually, with various ones of the known objects being tagged in different images. Once a threshold number of one of the object types have been identified in a series of images, AI Engine 622 may analyze a received image for similar objects and conclude that such an object is present in the image. For example, AI Engine 622 may be able to automatically identify a person, an article of clothing, a particular type of golf club, or the like. AI Engine 622 may also be configured to automatically identify different movement types, such as a type of golf swing, a type of body language, a thrown golf club, or the like.

In addition to capturing video, camera devices 601 may also include additional components configured to detect playing conditions or other data related to the playing of the golf hole. For example, the cameras may include microphones, radar, LIDAR, Wi-Fi radios, and/or GPS. In one aspect, a microphone may be used to detect the sound of the ball being hit, or to detect speech or other audio from the players on the hole. In one aspect, radar may be used to detect a swing speed of the golf club, or the speed at which the ball travels. The cameras 601 may include a wind speed detection mechanism, temperature gauge, humidity, or other weather-related course conditions.

Cameras 601 may also be used to detect the location of the golf ball after the ball has been hit and comes to rest at a new location on the hole. This location of the golf ball may be used to determine the distance that the ball traveled from its previous position to its new position. Similarly, the location of the golf ball may be used to determine the distance between the golf ball and other geographic locations, such as a water hazard, the front of the green, the back of the green, or the cup. This information determined from cameras 601 may be communicated to the players via mobile app 630, which may be installed on mobile device 631, which may be a personal mobile device or one provided by the golf course operator. In one aspect, mobile app 630 maybe provided to a golf cart, which may be considered mobile device 631.

In one example, cameras 601 may be used to identify the specific location of the pin on green 604. One or more of cameras 601 may detect the pin in the field of view. With cameras 601 in predetermined locations, system 600 may determine a precise location of the pin and provide this information to the players, such that a precise distance to the pin may be determined. Similar determinations may be made for other physical objects on the hole.

In one aspect, cameras 601 may be used to identify the specific location of the golf ball after it comes to rest. The location information of the ball may be used to determine remaining distance to the pin, distance from a previous location (such as the tee box to determine the length of the drive), or a distance from any other known or determined location. Accordingly, cameras 601 may be used to verify shots and provide statistics for various golfers. Similarly, cameras 601 may be used in combination with specific contests, such as a hole-in-one contest, long drive contest, closest to the pin contest, or the like.

Accordingly, system 600 can monitor a variety of factors related to the golf hole and the playing of the golf hole. The data related to these factors may collected for each group of golfers that play the hole, and this data may be collected and processed by AI engine 622 and Management System 628. AI engine 622 and Management System 628 may analyze these factors and provide further information related to the playing of the hole. For example, system 600 may determine the average score on the hole, the average distance off of the tee, and the average distance from the pin after an initial shot and subsequent shots. System 600 may determine that putts from a particular area on the green break a certain way or have an increased speed. System 600 may determine whether players tend to hit shots too long or too short from various locations on the hole.

System 600 may be configured to operate in response to the presence of golfers on the hole, such that video capture may be limited to such instances and such that little to no video capture occurs after players have left the hole. Player detection may be performed via video processing from cameras 601, or via geofence 636 described above.

In one aspect, mobile device 631 carried by the players may be used for player detection. In another aspect, the players may carry remote identifier 633, such as an RFID device, that is detected by cameras 601 when the RFID device is within range and determined to be present at the golf hole. In another aspect, the golf cart carrying the players may include a mobile communication device, GPS device, RFID device, or the like that is detectable by cameras 601. Mobile device 631 carried by the golfers, which may be in the form of a smartphone with an installed application thereon, may use its built-in Wi-Fi radio, cellular radio, Bluetooth radio, or the like to communicate with or be detected by system 600 to indicate the presence of the golfers.

In response to detecting the presence of the golfers on the hole, cameras 601 may automatically begin recording images. Cameras 601 may use image detection or AI to identify the golfers and focus on the location of the golfers to produce a desirable image. Alternatively, cameras 601 may be fixed and record everything within view, including all of the golfers on the hole.

While the golfers are playing the hole, cameras 601 may automatically record each of the shots being played and the movement of each of the golfers. Using AI engine 622, the captured images may be analyzed and specific images or objects within the images may be tagged and associated with the video. This tagged data may be then be used for providing an end product, such as a specific video or a marketing product.

System 600 may be used for object identification based on the use of an image data set. The image data set may be configured to identify objects associated with the specific players or objects associated with the golf course or its environment.

In one aspect, the image data set may identify one or more of the following objects associated with the players, including but not limited to: a person, a golfer, a shirt, a shirt color, a hat, a hat color, a golf glove, golf shoes, a golf cart, persons in a golf cart, a golf ball, a golf tee, a golf club, an iron, a driver, a utility club, a putter, a wedge, a 1-iron, a 2-iron, a 3-iron, a 4-iron, a 5-iron, a 6-iron, a 7-iron, an 8-iron, a 9-iron, a pitching wedge, a gap wedge, a sand wedge, a golf ball logo, a male, a female, a child, a junior, a shirt logo, caddies, a marshal, golf club brand, Callaway brand, TaylorMade brand, Titleist brand, Mizuno brand, a left handed golfer, a right golfer. It will be appreciated that other objects may also be identified and automatically tagged by the AI engine 622 or Management System 628.

In one aspect, the image data set may include objects associated with the golf course and surrounding environment, and may include, but is not limited to: the tee box, the color or the tee box, a golf cart, trees, the fairway, a cart path, the green, the pin, the hole, a sand bunker, a water hazard, a grass hazard, the woods, out-of-bounds, the rough, the first cut of the green, the second cut of the green, birds, insects, animals, distance from tee to pin, distance from tee to the front of green, distance from tee to middle of green, distance from tee to the back of the green, red stakes, white stakes, blue stakes, yellow stakes, red lines, white lines, yellow lines, changes in elevation, clouds, rain, snow, fog, mist, mud, wind, topology of the green, cut of the hole.

As described above, the image data set may be predetermined for use with system 600. To predetermine the image data set for system 600, a human observer or "stringer" may review multiple images provided from cameras at an initial time. The stringer may use software associated with system 600 to manually tag any objects that are present in the captured images. For example, in an image provided to the stringer, the stringer may identify a water hazard and the green. In a subsequent image, the stringer may identify a person and a particular golf club. This process may be repeated for multiple images to build the data set. System 600 may analyze each of the images or portions or images that are tagged with a particular object, and may determine attributes of the image or portion of the image that are common among each of the images or a threshold portion of the tagged images. System 600 may use machine learning based on the tagged images, and once a threshold number of images are tagged for a particular object, AI Engine 622 and/or Video Processing and Management System 628 will be capable of automatically identifying one or more of the objects of the data set without the need for human tagging.

Accordingly, once provided with the predetermined data set at a sufficient level, System 600 will automatically analyze each image that it receives during the process of video capturing and may assign any tag corresponding to an object of the image data set that was automatically detected. The tags that are automatically assigned may be assigned a time-stamp, thereby allowing for automatic processing of the video image for later provision to the players or third parties.

In addition to object identification, System 600 may also be used for gesture recognition. Gesture recognition may be determined based on a plurality of sequential image frames captured by cameras 601, with predetermined gestures included in the data set, including but not limited to pre-shot routines including: a golfer on the tee box, a practice swing, talking to other golfers, looking at the distance to the pin, setting the ball on the tee, stepping behind the ball, aligning for a swing, golfer addressing the ball, golf cart pulling up, golfer walking up, golfer carrying a bag, golfer pushing bag on a cart, golfer pulling bag on a cart, golfer walking with caddie.

Additional gesture recognition items may include gestures related to the golfer's shot, including but not limited to: the take away, the downswing, contact with the ball, missing the ball, duffing the ball, topping the ball, fatting the ball, thinning the ball, shanking the ball, hooking the ball, slicing the ball, popping the ball up, pulling the ball, pushing the ball, hitting the ball straight, hitting the ball low, hitting the ball high, the ball landing on the green, the ball landing in the sand, the ball landing in the water, the ball landing in the rough, the ball landing out-of-bounds, the ball landing in the trees, the ball hitting a tree, the ball hitting the pin, the ball hitting the cart path, the ball hitting a golfer/person, putting, putting too hard, putting too soft, putting left, putting right, hitting the ball past the green, hitting the ball short of the green, hitting the all left of the green, hitting the ball right of the green.

Additional gesture recognition may include post-shot gestures, including but not limited to: slamming the club, throwing the club, golfer giving a high five, golfer giving a fist bump, golfer putting his arms in the air, golfer pumping his fist, golfer running, golfer jumping, golfer slouching, golfer yelling, golfer picking up tee, golfer walking straight ahead, golfer clapping, golfer laughing.

Object recognition and gesture recognition may also be used to identify kinematic aspects of a golfer's swing. For example, AI engine 622 may use object recognition to identify the golf club, arms, legs, hips, etc. of the golfer, and gesture recognition to identify the path of the club and the movement of the arms, legs, hips, etc. AI engine 622 may determine and identify the movement of each of these objects to determine a swing type. For example, the swing may be too upright, or too flat, or the swing may not include proper hip rotation relative to arm movement. AI engine 622 may identify and categorize the swing based on its determination. The identification and categorization of the golfer's swing may be provided to a golf instructor, who may then contact the golfer associated with the swing to offer lessons or the like.

Object identification and gesture recognition may be used for a variety of purposes. In one aspect, object identification and gesture recognition may be used for marketing purposes. For example, in one aspect, object identification may be used to identify a brand of golf club, apparel, and/or golf ball being used. In response to identifying a brand, system 600 may provide marketing information related to the detected brand. Brand loyalty is common in golf equipment and apparel and, accordingly, providing marketing messages associated with the detected brand may be beneficial to the brand or its marketers. Alternatively, marketing information associated with competing brands may be provided to the golfer.

Object and gesture recognition may be used on combination with other automated detection mechanisms to track the play of the golfers of the hole, as further described below. In short, each shot for each golfer may be tracked, including the starting position and ending position for each shot hit by each golfer. Golfer identification and shot tracking may be processed automatically based on images received from cameras 601 as well as other tracking mechanisms such as position sensors, radar, etc.

To automatically track and record each shot for each golfer, the golfers are identified automatically by system 600. In one aspect, AI Engine 622 may identify and tag each of the golfers on the hole based on physical appearance, including but not limited to body shape, apparel, equipment, or the like. In another aspect, golfers may be identified by an object that they carry, such as their mobile device 631, an RFID tag, or the like. In one aspect, a golfer may present himself in front of one of cameras 601 and may input their user identification, and Ai Engine 622 may associate the golfer's appearance with the user-provided identification, such as the golfer's name.

AI Engine 622 may therefore identify and store each golfer's identity for later processing. System 600 may detect that the golfers are present and playing the hole based on inputs received from the golfers or based on proximity sensing or motion detection or image recognition. System 600 may then provide a signal to cameras 601 to begin recording the hole. Cameras 601 may record the hole from a variety of angles based on the position of cameras 601. Cameras 601 may use object and gesture recognition performed by AI Engine 622 to identify the golfer that is about to hit their shot. System 600 may further utilize microphones to detect when a shot is made, or may utilize radar to detect when the ball is in the air.

At the time of a particular shot from a particular golfer, system 600 may identify this particular instance of the recorded video with a particular golfer. System 600 may utilize object and gesture recognition, as well as other detection devices, to track the position of the ball relative to its previous position. System 600 may then record that the shot has been made, the distance of the shot, the remaining distance to the hole, and the like. System 600 may repeat this detection and tagging of various instances in the video received from cameras 601 as well as the accumulating statistics for each shot played.

System 600 may detect the position of each golfer on the hole using object and gesture recognition. Based on the detected position of the golfer, system 600 may provide information to the golfer relevant to the golfer's position. For example, system 600 may act as a virtual caddie, providing shot advice in addition to traditional information such as distance to the pin. In one aspect, system 600 may provide information regarding the wind speed and direction, or an elevation change, and may suggest an adjustment to the golfer's typical club selection.

System 600 may record each golfer's club used and the corresponding distance achieved with different clubs to provide advice regarding which club to use from different areas of the hole. For example, if the golfer typically hits a 7-iron 180 yards from the fairway and 160-yards from the rough, system 600 may advise the golfer to use a 6-iron when the golfer is 180 yards from the pin if the ball is located in the rough. Similarly, if there is a tailwind, system 600 may suggest using less club.

AI Engine 622 may aggregate the data for the individual golfer and may also aggregate relative data from other golfers to provide a playing recommendation based on the factors present for each shot.

As described above system 600 will record the data associated with each shot played by each player and store this data for analysis by AI Engine 622 and/or Processing and Management System 628. System 600 may thereafter process the accumulated shot-based data for providing various end products.

It will be appreciated that processing may be performed by modules associated with AI Engine 622 and/or Video Processing and Management System 628, with some aspects of processing being performed locally and others being performed remotely. Accordingly, processing described as being performed by AI Engine 622 may also be performed by Video Processing and Management System 628, and vice versa. Additioanlly, system 600 may be referred to generally as performing a process, and it will be appreciated that such reference may refer to AI Engine 622 and/or Video Processing and Management System 628.

AI engine 622 may process the shot-based data to track individual achievements and/or scoring for each player. Such information may be provided directly to the players or to third parties, such as an entity associated with a particular contest. For example, AI engine 622 may automatically track and provide each player's score for a given hole or for an entire round. AI Engine 622 may automatically provide a closest to the hole, hole in one, long drive, greens in regulation, fairways hit, sand saves, or other predetermined achievements that occur during play that are not reflected in a simple overall score. System 600 may automatically provide this information to player's mobile device 631.

The various tracked scores and achievements may be compared to other players playing with a given player, and a winner may be determined based on predetermined settings related to the competition. For example, the players may compete with each other straight up, such that a simple overall score comparison may be made. Alternatively, scores may be determined based on player handicaps. Scores may be determined based on a team-based competition, such as best ball or alternate shot. Scores may be determined in a match-play format. Scores may be determined based on Stableford scoring. Scores may be determined in a variety of other ways with predetermined scoring settings applied to the recordation of the shots being played by each of the players.

Player scores may be compared to other players playing the same course on the same day or different days. Additionally, player scores may be compared to other players playing on different courses. Scores from different courses may be compared straight up, relative to par, adjusted based on course difficulty, or unadjusted. Various other methods of comparing scores among players at the same of different courses and timeframes may also be used according to the desire of the users.

As described above, AI engine 622 is operable to identify particular players and the shots played by each player, in addition to data associated with each of the shots. Accordingly, system 600 may be operable to identify particular shots of interest via object and gesture recognition. For example, object recognition may identify the player and the ball and the shots played. Gesture recognition may identify specific reactions, which may also be used to identify interesting shot types or results. These predetermined shot-types may be tagged and later provided in video form for entertainment purposes, as further described below.

As mentioned previously, video provided by cameras 601 may be processed by AI engine 622 and provided to the players or third parties, such as to mobile device 631. In one aspect, when players are present at a hole and playing the hole, cameras 601 will record each of the players and each of the shots. Accordingly, multiple angles and views of the shots played by the players are transmitted to AI engine 622 from cameras 601 via interface 624. The video from cameras 601 that is received at AI engine 622 may be considered to be "raw" video that is subsequently tagged and processed and provided for later use, such as competitive verification or for entertainment purposes.

In one aspect, AI engine 622 tags each shot based on one or more of object recognition, gesture recognition, audio inputs, or the like. Accordingly, various segments of the raw video may be tagged with a particular player. AI engine 622 may then automatically edit the video and provide a video showing each shot for a particular player. The provided video may include various angles of each shot, similar to professional broadcast. For example, the video may include the player approaching the tee box and setting up for his shot. The video may cut to another angle prior to his shot to show another view of the player's pre-shot routine. The video may then cut to a view of the player taking his shot. With the ball in the air, the video may then cut to a view of the fairway or green where the ball has landed. Accordingly, each individual shot may include various angles and views of the shot. The editing of the video may be performed automatically by AI engine 622.

As the video is being recorded, a further player is likely to play a shot prior to the first player playing his next shot. This further player's shots may be tagged and edited in a similar fashion. While the further player is playing their shot, the first player may be observing the further player's shot.

When the first player subsequently takes their next shot, this portion of the video may be tagged and edited similar to the initial shot, and this subsequent video may be combined with the initial video segment(s) to provide a video record of the first player's shots in a sequential fashion limited to the first player. The same process may be repeated for other players.

Accordingly, AI engine 622 may automatically edit and generate a video record for each individual player and may provide this record automatically to the player, for example to their mobile device 631 or to a third party.

In another approach, AI engine 622 may edit and generate a video record for multiple players and combine multiple players'shots in the same video recording, if desired. The video may cut between players in the order that the shots are played, or may combine individual player's shots in a sequential fashion, such that each player's shots from one hole are shown, followed by the shots of the further player.

As described above, the video recording has been described as switching between various angles or views of the same instance. However, the video may also be automatically generated to provide multiple views at the same time. For example, a view from behind the tee box may be presented at the same time as a view from behind the green. Such views may be provided in a split-screen format or picture-in-picture format. Similarly, more than two views may be provided at the same time. For example, a tee shot may be displayed illustrating the player's front side, back side, and from behind the tee box, which may better illustrate a player's swing for both entertainment and evaluation purposes.

In addition to providing a video record of a player's round, the AI engine 622 may also provide portions of the player's round for specific entertainment purposes. For example, video recordings of each shot may be tagged for a "blooper reel" type purpose. Such videos have a high degree of entertainment value and provide further marketing value for golf courses or other products.

For example, in one aspect, AI engine 622 may tag and identify an entertaining post-shot gesture, such as a player throwing their golf club and having it land in a lake or a tree. Similarly, the player may break their club in frustration. Similarly, the player may miss the ball during a swing, or may fall over after their swing. It will be appreciated that various other types of gestures may be identified and tagged for generating video clips according to the desires of the users.

In addition to the edited video generated by AI engine 622, the video generated and/or provided may also include post-processing to include graphics or video enhancements. In one aspect, the player's name may be provided on the screen prior to their shot. In another aspect, the player's score may be provided on the screen. In another aspect, the club being used may be displayed. Various other graphics may be overlaid on the screen to provide a video resembling a professional broadcast. The graphics overlaid on the video may include various data associated with the player or the shot being played. The information provided by the graphic may be automatically identified or detected by AI engine 622 via object or gesture recognition based on the image data set described above.

In one aspect, video enhancements may be added to the video based on the shot being played. For example, if the result of the shot is the ball landing in a water hazard, a splash graphic or animation may be added to video near the area where the ball entered the water. If the ball lands in the woods, an animal, such as a squirrel, may be added via animation to appear as if it is picking up the ball. If the ball enters a sand hazard, a beach ball or umbrella may be added to the location of the ball. Various other animations related to the result of the shot may be added.

AI engine 622 may automatically produce these video animations or graphics enhancements in the process of tagging the result of the shot or a gesture associated with the shot. Depending on the desires of the user, system 600 may be programmed to automatically upload or provide the video to the player or a third party.

In one aspect, the video clip may be provided automatically to a social media account, such as Twitter, Instagram, Facebook, or the like. The video may be automatically uploaded to a social media account associated with the player, or the video may be automatically uploaded/provided to a social media account of another party such as the golf course or the operator of a competition or event in which the player is participating.

In one aspect, AI engine 622 may provide video, including live video or recorded and processed video, to a separate location on the golf course where the players are present. For example, the video may be uploaded to televisions or other video screens located at a restaurant or bar of the golf course. The video may be displayed to other players that have finished their round or players waiting to play their round. In one aspect, the video recording may be provided automatically when the players being recorded have entered the area displaying the video, such that the players may view their shots once they arrive. Location data related to the players may be tracked by system 600 (such as via GPS in the golf cart, location data from the mobile device, RFID tags, etc.), and in response to the players entering a specified area, such as the bar/restaurant, system 600 may provide the video to televisions or screens located within the same specified area (such as the bar/restaurant).

Aspects of system 600 may be provided at a variety of golf courses, with golf courses having system 600 installed being identified in advance to users wishing to make use of the features associated with system 600. Participating golf courses may be identified and marketed to players via mobile app 630 that may be installed on players personal mobile devices 631, enabling searching via mobile device 631 and app 630 to identify and locate the participating golf courses.

Mobile app 630 may use location services to alert players to nearby courses that include system 600. Mobile app 630 may provide the ability to book tee times, pay for rounds, pay for contests or events, or the like. Mobile app 630 may further provide a matchmaking function to locate other golfers having the app installed and for creating competitions between users of mobile app 630.

Mobile app 630 may be used in combination with course app 632. Course app 632 may be configured to book tee times and manage usage of the golf course. Course app 632 may process payments and conduct contests or other competitions among registered players. Course app 632 may further be configured to provide player management services, such as tracking and storing various player statistics, which may be accessed by mobile app 630. Course app 632 may be used to promote and market various course services, sand may be configured to use adaptive pricing based on demand. For example, when demand is low, course app 632 may automatically promote discounted pricing for playing a round at the course or for participating in a contest or event at the golf course.

One type of contest may be referred to as a hole-in-one competition contest or HIO competition. The HIO competition may be provided by any golf course having system 600 installed. As described above, system 600 includes various automatic detection services, such as the AI engine 622, that can track and identify shots played by various players. Accordingly, system 600 can automatically detect when a particular shot has been achieved. Thus, system 600 may be used to manage a hole-in-one competition at various courses. The HIO competition is one type of hole-in-one contest. However, other types of contests, like closest to the pin or long drive, can also be managed by the system.

As described above, video clips of predetermined events may be automatically processed and uploaded/provided by AI engine 622 in response to such an event. Accordingly, in the event of a successful hole-in-one during the HIO competition, the video of the winning shot can be automatically provided to interested parties via mobile app 630 or course app 632.

The above-described competition at different courses may be applied to traditional rounds of golf or other contests, which can occur over an extended period of time or number of rounds. Course app 632 may be configured to track user achievement and scores over time, and may be configured to create a leaderboard among active users. Various methods of managing the completion may be used to market this service to an increased number of players. For example, competitions may be occur via a handicap system, allowing players of different skill to compete with each other over a number of rounds. Various points may be accumulated based on predetermined scoring rules. For example, a net birdie or net eagle may be worth a predetermined number of points, and the player with the most points after playing a predetermined number of times may be determined the winner.

In view of the above, system 600 may be configured to perform each of the above-described aspects, depending on the needs of the user. Various methods are contemplated by system 600, which are set forth in further detail below. It will be appreciated that various aspects of the described methods may be excluded for the method to operate, and that additional steps may also be performed to tailor the method to the needs of the user.

In one aspect, a method for installing an app for players on a golf course is provided. The method includes providing the player app at an app store, receiving a request to download the app, permitting download of the app to the player. The method may further include receiving player information from the app, creating an account for the player, and authorizing use of the player app.

In another aspect, a method of managing system 600 is provided. The method includes receiving, at a network device, data from one or more of a hub, a camera, or drone. The method further includes providing a control signal, via the network device, to one or more of the hub, camera, or drone for controlling the hub, camera, or drone.

In another aspect, a method of identifying a user is provided. The method includes identifying a first user, detecting the first user, tagging the first user, and identifying data associated with the first user. The identifying step may be performed via Artificial Intelligence, Facial Recognition, GPS, Motion Detection from a camera, object identification, gesture identification, Bluetooth, or RFID.

In another aspect, a method of processing video is provided. The method includes receiving video from a hub device located on a golf course at a network device, analyzing the video at the network device, identifying players in the video, identifying shots played from the video, and processing the video. The method may further include providing a processed video to a player. The network device may be a remote network device or a local network device. The network device may be installed on a player's mobile device.

In another aspect, a method for uploading a video is provided. The method includes processing raw video data at a network device and generating a video file. The method further includes sending video to a further network device, wherein the further network device is a social media platform or a webpage.

In another aspect, a method for altering image data is provided. The method includes receiving raw video data at a network device. The method further includes detecting objects or gestures contained in the raw video data. The method further includes generating a video file and adding graphical enhancements to the raw video data. In one aspect, the method includes adjusting a view provided by the raw video data. The method may include zooming in on the video, zooming out on the video, or panning within the video.

In another aspect, a method for creating content from video data received from cameras. The method includes receiving raw video data from a camera device and processing the raw video and generating a video file. The method further includes providing the video file to a user's mobile device. The method further includes providing the video file in response to receiving a signal from the mobile device. In one aspect, the signal includes location data, wherein the location data indicates that the mobile device is present in a predetermined location.

In another aspect, a method of monitoring daily contests for players is provided. The method includes receiving data associated with a particular player indicating participation in a daily contest. The method further includes identifying shots played by the particular player and storing data associated with the result of the shots played. The shot data may include at least one of distance, distance remaining to a pin, or completing a shot into the hole in a predetermined number of strokes. The predetermined number of strokes may be one (1). The method may include storing data for multiple players and determining a winner from the data associated with the multiple players. The method may further include defining a player of the day or a leaderboard of winners and/or losers. The method may include presenting the player of day and/or the leaderboard.

In another aspect, a method of processing audio data is provided. The method may include receiving audio data from a microphone located on a golf course. The method may further include identifying a segment of the audio data corresponding to a predetermined list of words. The predetermined list of words may include words defined as negative words and/or words defined as positive words. Negative words may include swear words or other words associated with a poor shot. Positive words may include words associated with a good shot.

In another aspect, a method of processing video is provided. The method may include receiving raw image data from a camera device. The method may further include automatically identifying a player and/or a golf ball in the video. The method may further include automatically zooming in on the identified player and/or ball.

In another aspect, a method of providing shot tracing enhancements to a video is provided. The method may include receiving raw video data from a camera device. The method may further include identifying a ball in the video. The method may further include tracking a path of the ball in the video during movement of the ball. The method may further include adding a trailing line to the ball corresponding to the path of the ball.

In another aspect, a method of providing statistics is provided. The method includes identifying data associated with at least one of a golf hole or players. The method further includes providing the data associated with the golf hole or the player. The method may include presenting an average score on the hole, a rate of reaching the green in the regulation for the hole, an average distance to the pin on the hole, or an average driving distance on the hole. The method may include presenting a score of the player, presenting the rate of greens in regulation for the player, the average driving distance of the player, or the average distance to the pin for the player. The data may be associated with a single round, a single day, multiple rounds, multiple days, a single player, and/or multiple players. The method may include creating stats for players across a single hole or all holes played. The method may include providing a pin drop graphic in a video or a representation of the hole. The pin drop may corresponding to a single player's shot(s) or for multiple players on the hole. The pin drop may include a link to a video associated with a shot identified by the pin drop.

In another aspect, a method of identifying trends associated with a hole or a player is provided. The method may include analyzing multiple shots played at a hole and determining shot tendencies based on data from multiple players. The method may include identifying a topology of a green. The method may include identifying a speed of a ball putted on the green. The method may include identifying a break for a green from multiple locations. The identifying may be performed via artificial intelligence and machine learning. The method may include determining shot tendencies associated with a particular golfer. The method may include providing playing advice based on the shot tendencies of the particular golfer and the shot tendencies associated with the hole. The method may include providing additional advice based on weather conditions and/or course conditions.

In another aspect, a method for providing marketing products is provided. The method may include using artificial intelligence and identifying an object from raw video data, the object corresponding to a particular brand, apparel type, club type, and/or swing type. The method may further include providing an advertisement associated with the identified object. The advertisement may be associated with a brand or apparel type. The advertisement may be associated with a personal service, such as a lesson.

In one aspect, system 600 may include a drone device 627 located at the golf course. Drone device 627 may include video recording capabilities similar to cameras 601 and flyover capabilities. Drone device 627 may be in communication with interface 624. Drone device 627 may be configured to automatically fly over the hole and record video of the hole. In one aspect, drone device 627 is configured to fly over the hole while golfers are not present, such as between playing groups or prior to the course opening for play. Drone device 627 may receive a signal directly or indirectly from the system 600 to control drone device 627 to record a fly-over video. Drone device 627 may thereafter provide the video to AI Engine 622. The video from drone device 627 may be automatically included in a video file generated by AI engine 622, thereby providing an introduction portion to the video generated by AI engine 622 and later provided to the players or third parties.

In another aspect, AI engine 622 may be configured to automatically identify a caddie for a particular player based on data associated with the player. For example, AI engine 622 may identify certain shot tendencies or biographical data associated with the player. AI engine 622 may automatically match a particular caddie with a player based on data associated with the player. AI engine 622 may be configured to receive ratings or feedback from the player related to the caddie, and AI engine 622 may adjust future assignments based on feedback.

AI engine 622 may further receive information regarding course conditions from sensors disposed on the course, such as at interface 624 or the cameras 601. Sensors may be in the form of weather sensors configured to determined temperature, wind speed, etc. The sensors may also be configured to detect course hydration levels, including data associated with how often the course has been watered, the last time it was watered, the last time it rained, etc. AI engine 622 may analyze this data and provide this data to the players as part of a playing recommendation.

With reference to FIG. 7, remote golf course video processing and management system 700 is illustrated, which may be used for any of the remote video processing and management systems described herein, such as remote video processing and management system 628 described above. System 700 may be used to perform the various operations described above and have the above-described functionality. FIG. 7 illustrates various interconnected modules and other processing components.

System 700 includes AI enabled graphics processing engine 720 which is in communication with golf course management engine 701. Graphics processing engine 720 is in communication with AI Logic Engine 724 and Assets 722. Multiple modules are in communication with Processing Engine 720.

Processing Engine 720 is in communication with AI Enabled Shot Tracking Module 726, AI Enabled Hole In One Detection Module 728, AI Enabled Closest to the Pin Module 730, AI Enabled Gesture Module 732, and AI Enabled Golf Module 734. Each of these modules may be configured to automatically process video and detect various objects or aspects within the video to perform the associated functionality of the modules, as described above regarding the functionality of the systems of this disclosure.

Golf Course Management Engine 701 is in communication with Distribution Management/Communications Module 706, which is in communication with Mobiles/Storage/Social Engine 740. Course Management Engine 701 is also in communication with Cloud Storage 704, which is in communication with Remote Video Interface 702. Remote Video Interface 702 receives raw or processed video for further processing by system 700 and its associated modules.

Course Management Engine 701 is in communication with additional modules, including AI Player Detection Module 708, Player Preferences 710, Player Profile Manager 712, Game Module 714 (for Hole In One, Closest to the Pin, and other games), and Player Management Services 718.

System 700 may be disposed remotely from the golf course and receive video and data vie remote video interface 702. However, it will be appreciated that system 700 may also be disposed locally and achieve similar functionality.

Figure 9:
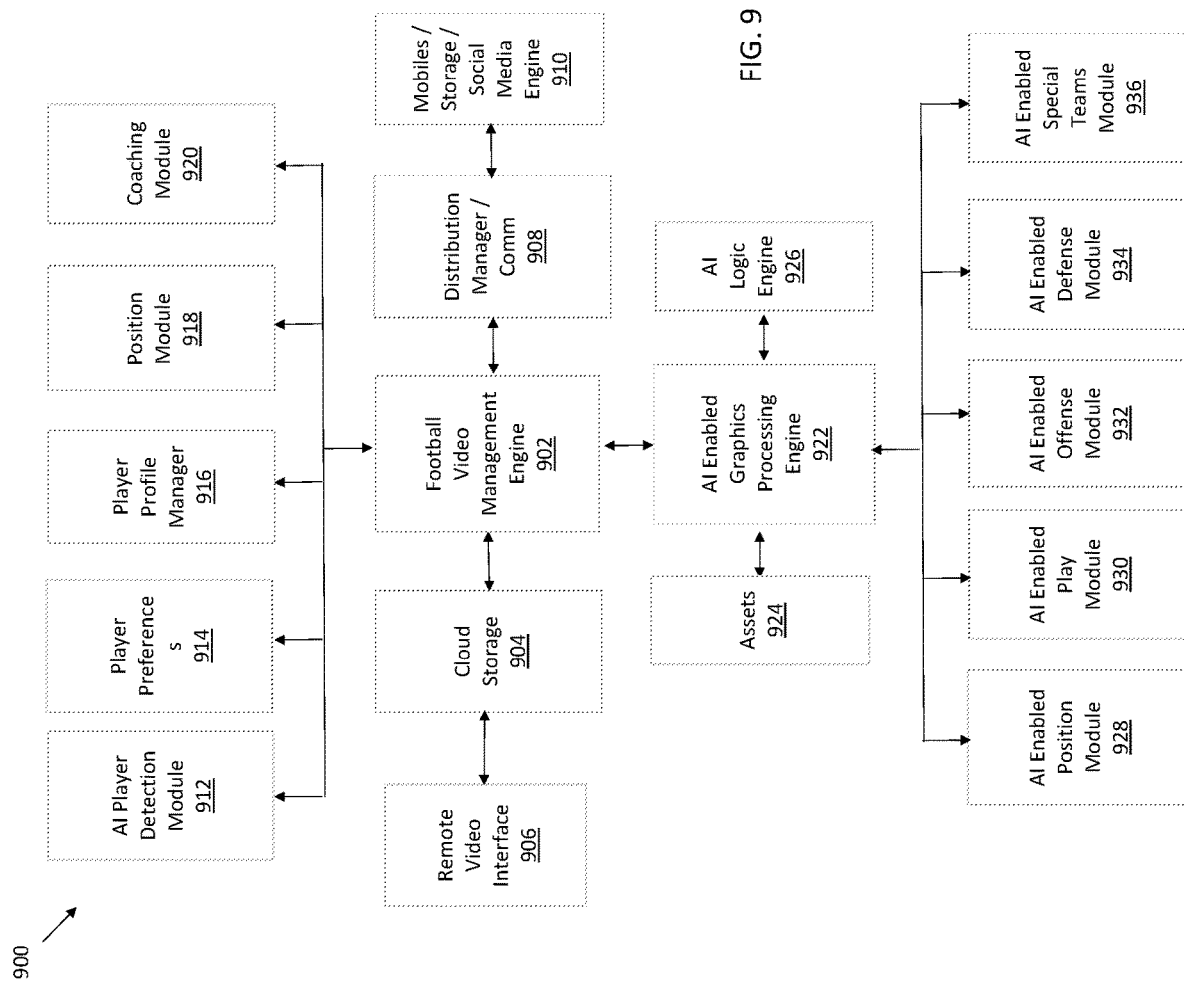
FIG. 9 is a block diagram illustrating one example of an AI enabled remote football field video processing and management system in accordance with an aspect of the present disclosure.

As described previously, the present disclosure may be directed to activities other than golf, and the above-described functionality may be tailored for these other types of activities. An example of another activity is illustrated in FIGS. 8 and 9.

With reference to FIG. 8, system 800 for automatically monitoring and recording a football activity is illustrated. FIG. 8 illustrates system 800 disposed at football practice field 802.

System 800 includes multiple cameras 804, 806, 808, 810 in communication with AI Video Processing Engine 830, which may include fiber communication. System 800 further includes cameras 812, 814, 816 in communication with AI Video Processing Engine 828, which may include fiber communication. System 800 further includes cameras 818, 820, 822, 824 in communication with AI Video Processing Engine 826, which may include fiber communication.

AI Video Processing Engines 826, 828, 830 are in communication with Remote Video Processing and Management System 832. Video Processing and Management System 832 may include similar functionality to that of System 700 described above (configured for golf but adjustable for other sports) and the other functionality described in this disclosure.

FIG. 9 illustrates Remote Video Processing and Management System 900, which may be used for System 832.

System 900 includes AI Enabled Graphics Processing Engine 922 which is in communication with Football Video Management Engine 902. Graphics Processing Engine 922 is in communication with AI Logic Engine 926 and Assets 924. Multiple modules are in communication with Processing Engine 922.

Processing Engine 922 is in communication with AI Enabled Position Module 928, AI Enabled Play Module 930, AI Enabled Offense Module 932, AI Enabled Defense Module 934, and AI Enabled Special Teams Module 936. Each of these modules may be configured to automatically process video and detect various objects or aspects within the video to perform the associated functionality of the modules, as described above regarding the functionality of the systems of this disclosure. For example, each of these modules may be configured to detect activities associated with each of the modules, such as detecting positions, plays, offense, defense, and special teams.

Management Engine 902 is in communication with Distribution Management/Comm 908, which is in communication with Mobiles/Storage/Social Engine 910. Management Engine 902 is also in communication with Cloud Storage 904, which is in communication with Remote Video Interface 906.

Management Engine 902 is in communication with additional modules, include AI Player Detection Module 912, Player Preferences 914, Player Profile Manager 916, Position Module 918, and Coaching Module 920.

System 900 may be disposed remotely from the football field and receive video and data via remote video interface 906. However, it will be appreciated that system 900 may also be disposed locally and achieve similar functionality.

In view of the above, both a golf activity and a football activity have been described. it will be appreciated that various other athletic activities, such as the alternative activities described above, may be automatically monitored and recorded. For instance, the location of the athletic activity may be referred to generally as an athletic activity area (such as a golf course football field, ski slope, snowboard half-pipe, or the like). Various areas of the athletic activity area may include various hardware, such as the cameras (which may be fixed and permanently located, unlike temporary devices used at annual tournaments or races), and the areas may include a start area (such as teebox, or the top of the ski slope or halfpipe) and finish area (such as the green or the bottom of the ski slope or halfpipe). Various objects or equipment made with reference to golf may be equally applied to objects or equipment related to skiing or snowboard, or any other athletic activity. References to a golfer or player may be applicable to a skier, snowboarder, or other athlete. Aspects of the athletic activity, such as a golf shot or other athletic performance may be referred to generally as a trial or athletic trial, and can include a single gesture or a series of gestures or performances depending on the type of activity being monitored and recorded.

FIG. 10 illustrates one aspect of a method 1000 associated with the above described systems. In one aspect, the method 1000 of automatically recording an athletic performance is provided. The method 1000 includes: at step 1002, detecting, by a processor, that at least one player is positioned within a predetermined area; at step 1004 identifying a first player of the at least one player; at step 1006, automatically recording, by at least one camera operatively coupled to the processor, a performance of the first player and defining a first recording; at step 1008, automatically storing, in a database operatively coupled to the processor, the first recording; at step 1010 automatically correlating the first recording with the first player; and, at step 1012, automatically processing the first recording and defining a first processed recording.

FIG. 11 illustrates one aspect of a method 1100 of automatically recording and providing video in accordance with aspects, of the above-described systems. The method 1100 may include: at step 1102, recording a video of a predetermined activity using a first remote camera located at a first geographic location; and at step 1104, processing the video at the first geographic location. The processing may include: at step 1106, identifying a first user performing the predetermined activity; at step 1108, extracting image frames from the video including the first user during the predetermined activity; and at step 1110, merging the extracted image frames to generate a formatted video. The method 1100 may also include, at step 1112, outputting the formatted video to a remote video processing system for additional processing.

It will be appreciated that various other additional method steps maybe included in the above method, or the above method may be modified in accordance with the functionality of the system 100 described above.

It will be appreciated that such aspects and embodiments are more than an abstract idea performed by a computer or other controller. The above-described aspects are automatically performed based on a variety of inputs that are not easily accessible or determined, and the resulting end product cannot otherwise be provided in the same automatic manner.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A system for automatically monitoring and recording an athletic activity comprising:
   at least one camera device installed at an athletic activity area and configured to receive a signal indicating athletes are present at the athletic activity area and record video, the signal indicating the athletes are present at the athletic activity area based on detection of at least one of the athletes being within a field of view of the at least one camera device;
   a network device in communication with the at least one camera device, the network device including a processor, non-transitory computer readable medium, database, and software;
   an artificial intelligence engine operable on the network device;
   wherein the database includes a plurality of predetermined image data sets identifying a plurality of predetermined objects or gestures;
   wherein the artificial intelligence engine is configured to receive video from the-at least one camera device and automatically identify objects or gestures present in the video and tag identified objects or gestures;
   wherein the artificial intelligence engine is configured to identify kinematic aspects of the athletic activity for individual ones of the athletes based on the identified gestures;
   wherein the artificial intelligence engine is configured to process the video and generate a video file based on the identified objects; and
   wherein the processor of the network device is configured to determine whether at least one of the athletes have left the field of view of the at least one camera device and in response to determining that the at least one of the athletes have left the field of view of the at least one camera device, splice segments of the video associated with the at least one of the athletes into a composite video file for the at least one of the athletes and communicate the video file to the at least one of the athletes.

2. The system of claim 1, wherein the at least one camera device includes a plurality of camera devices disposed around the athletic activity area.

3. The system of claim 2, wherein a first camera device of the plurality of camera devices is disposed adjacent a start area of the athletic activity area.

4. The system of claim 3, wherein a second camera device of the plurality of camera devices is disposed adjacent a finish area of the athletic activity area.

5. The system of claim 1, wherein the at least one camera device is configured to automatically monitor and track athletes on the athletic activity area.

6. The system of claim 1, further including a remote identifier associated with at least one of the athletes and configured to communicate with the at least one camera device to indicate the at least one of the athletes are present at the athletic activity area.

7. The system of claim 1, wherein the kinematic aspects of the athletic activity identified for the individual ones of the athletes may be further used to provide feedback to the individual ones of the athletes for improving performance at the athletic activity.

8. A method of automatically monitoring and recording an athletic activity, the method comprising the steps of:
   detecting athletes being within a field of view of a camera device installed on the athletic activity area, the field of view associated with one or more portions of an athletic activity area;
   at a camera device installed on the athletic activity area, automatically recording video in response to detecting the athletes on the athletic activity area based at least in part on a signal received by the camera device indicating athletes present at the athletic activity area, the signal indicating the athletes are present at the athletic activity area based on the detection of at least one of the athletes being within the field of view of the camera device;
   wherein the camera device is in communication with a network device, the network device including a processor, non-transitory computer readable medium, database, and software, wherein the network device further includes an artificial intelligence engine operable on the network device, wherein the database includes a plurality of predetermined image data sets identifying a plurality of predetermined objects or gestures;

at the artificial intelligence engine, receiving video from the camera device and automatically identifying objects or gestures present in the video and tagging identified objects or gestures;

at the artificial intelligence engine, identifying kinematic aspects of the athletic activity for individual ones of the athletes based on the identified gestures;

at the artificial intelligence engine, processing the video and generating a processed video file based on the identified objects; and at the processor of the network device, determining whether at least one of the athletes have left the field of view of the camera device and in response to determining that the at least one of the athletes have left the field of view of the camera device, splicing segments of the video associated with the at least one of the athletes into a composite video file for the at least one of the athletes and communicating the video file to the at least one of the athletes.

9. The method of claim 8, further comprising transmitting the processed video file to a second network device for display thereon.

10. A system for automatically monitoring activity, the system providing:

at least one camera device installed at a competition area and configured to receive a signal indicating athletes are present at the competition area and record video, the signal indicating the athletes are present at the competition area based on detection of at least one of the athletes being within a field of view of the at least one camera device;

a network device in communication with the camera device, the network device including a processor, non-transitory computer readable medium, database, and software;

an artificial intelligence engine operable on the network device;

wherein the database includes a plurality of predetermined image data sets identifying a plurality of predetermined objects or gestures;

wherein the artificial intelligence engine is configured to receive video from the at least one camera device and automatically identify objects or gestures present in the video and tag identified objects or gestures;

wherein the artificial intelligence engine is configured to process the video and generate a video file based on the identified objects; and wherein the processor of the network device is configured to determine whether at least one of the athletes have left the field of view of the at least one camera device and in response to determining that the at least one of the athletes have left the field of view of the at least one camera device, splice segments of the video associated with the at least one of the athletes into a composite video file for the at least one of the athletes and communicate the video file to the at least one of the athletes.

11. The system of claim 10, wherein the competition area is a ski or snowboard slope, and the predetermined objects or gestures are ski or snowboard related.

12. The system of claim 11, further comprising at least one hub device in communication with the at least one camera device, wherein the at least one hub device is in communication with the network device.

13. The system of claim 12, wherein the at least one camera device includes a first set of cameras disposed adjacent a start area of the competition area and a second set of cameras disposed adjacent a finish area of the competition area.

14. The system of claim 13, wherein the at least one hub device includes a start area hub device disposed adjacent the start area, a finish area hub device disposed adjacent the finish area, and a competition area hub device, wherein the start area hub device and the finish area hub device are in communication with the competition area hub device, and the competition area hub device is in communication with the network device.

15. The system of claim 14, wherein the first set of cameras includes a camera behind the start area and two cameras on opposite sides of the start area, and the second set of cameras includes a camera behind the finish area and two cameras on opposite sides of the finish area.

16. The system of claim 11, further comprising an athlete app configured for installation on a mobile device, wherein the athlete app is configured to receive videos from the network device.

17. The system of claim 16, further comprising an athletic area management app in communication with the athlete app.

18. The system of claim 11, wherein the artificial intelligence engine automatically identifies athletes and athletic trials from the video received from the at least one camera device.

19. The system of claim 18, wherein the artificial intelligence engine automatically edits the video based on an identified athlete and trials corresponding to the identified athlete and generates a video including each trial corresponding to the identified athlete.

20. The system of claim 11, wherein the artificial intelligence automatically identifies a predetermined gesture in the video received from the at least one camera device and generates a video including the predetermined gesture.

* * * * *